US011862412B1

(12) United States Patent
von Arx et al.

(10) Patent No.: US 11,862,412 B1
(45) Date of Patent: Jan. 2, 2024

(54) SYSTEM AND METHOD FOR REDUCED TORQUE SWITCHING

(71) Applicant: Rockwell Automation Switzerland GmbH, Industriestrasse (CH)

(72) Inventors: Rahel von Arx, Schinznach-Dorf (CH); Sadashiv Devidasrao Pimple, Zuchwil (CH); David Urech, Mellingen (CH)

(73) Assignee: Rockwell Automation Switzerland GmbH, Aarau (CH)

( * ) Notice: Subject to any disclaimer, the term of this patent is extended or adjusted under 35 U.S.C. 154(b) by 0 days.

(21) Appl. No.: 17/949,401

(22) Filed: Sep. 21, 2022

(51) Int. Cl.
*H01H 19/14* (2006.01)
*H01H 19/46* (2006.01)

(52) U.S. Cl.
CPC ............ *H01H 19/14* (2013.01); *H01H 19/46* (2013.01)

(58) Field of Classification Search
CPC ...... H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 2009/305; H01H 9/302; H01H 9/34; H01H 9/342; H01H 50/643; H01H 50/645; H01H 50/32; H01H 5/18; H01H 5/08; H01H 5/06; H01H 2300/046
See application file for complete search history.

(56) References Cited

U.S. PATENT DOCUMENTS

| | | | | | |
|---|---|---|---|---|---|
| 5,569,894 | A * | 10/1996 | Uchida | H01H 9/446 | 218/27 |
| 2013/0118872 | A1 * | 5/2013 | Fleitmann | H01H 71/503 | 200/325 |
| 2015/0235794 | A1 * | 8/2015 | Rakuff | H01H 50/643 | 335/171 |

* cited by examiner

*Primary Examiner* — Ahmed M Saeed
(74) *Attorney, Agent, or Firm* — Boyle Fredrickson, S.C.

(57) ABSTRACT

A switching device for industrial equipment having at least one pair of contacts includes a transfer member rotatably mounted in the switching device. The transfer member is configured to receive a first force applied to the switching device in a first direction and to receive a second force applied to the switching device in a second direction. A rocker arm, rotatably mounted in the switching device, engages the transfer member to receive the first force over a first angle of rotation and to receive the second force over a second angle of rotation. The second angle of rotation is less than the first angle of rotation. A lever arm is pivotally mounted within the switching device. The lever arm engages the rocker arm to move between an Off position and an On position, and a plunger is actuated by the lever arm to selectively open and close the contacts.

20 Claims, 27 Drawing Sheets

SYSTEM AND METHOD FOR REDUCED TORQUE SWITCHING

BACKGROUND INFORMATION

The subject matter disclosed herein relates to switching devices for industrial equipment. More specifically, an aspect of the invention relates to switching devices that include a rotary switching mechanism and a system for reducing the torque required to rotate the switch between the Off and On positions.

As is known to those skilled in the art, switching devices are components in an electrical circuit that may be controlled between an "On" state and an "Off" state. In the On state, the switching device establishes an electrical connection between contacts and allows electrical current to flow through the switching device from a power source to an electrical load. In the Off state, the switching device opens, or breaks, the electrical connection between contacts, preventing the electrical current from flowing through the switching device. Switching devices may be used, for example, as a circuit breaker, motor protection device, contactor to supply power to one or more branch circuits, or the like. The switching device may be manually or automatically actuated.

According to one style of manually activated switch, a rotary actuator is provided which rotates between an Off position and an On position. Within the switch, a mechanical linkage is provided which similarly transitions between an Off state and an On state as the rotary actuator is rotated between the Off position and the On position. The rotary actuator includes a handle on a rotary disk, where the rotary actuator is located on an external surface of the switch and is accessible by an operator. When the operator rotates the handle, the rotary actuator engages a mechanical linkage within the switch which allows a plunger to move a switching element within the switching device in a first direction as the switch or actuator transitions from a first state to a second state. The plunger is extended when transitioning from an On state to an Off state, causing separation of electrical contacts and breaking an electrical connection within the switch. A spring exerts a force against the plunger, causing the plunger to retract when transitioning from the Off state back to the On state, allowing the electrical contacts to reconnect and establish an electrical connection within the switch.

Typically, a switch requires actuation in both directions, that is from the Off state to the On state as well as from the On state to the Off state, at the same position within the switch. The mechanical linkage between the rotary actuator and the contacts typically provides a continuous linkage between the rotary actuator and the contacts, such that motion in a first direction will transition between the Off state and the On state at a particular location during the rotation and that motion in a second direction will transition between the On state and the Off state at the same location during the rotation. These continuous mechanical linkages require the force applied to the rotary actuator to move the mechanical linkage between states to be applied generally at the transition point. The rotary actuator, however, is often moved a greater distance, such as over a ninety-degree arc such that a clear indication is provided to an operator whether the switch is in the Off state or the On state. Thus, the entire force required to transition between states is applied over a limited range of rotation of the total travel of the actuator as the switch is toggled between the Off and On states.

Applying the entire force for transitioning between states at a single point in the rotation creates a jerky motion when operating the switch. An operator begins rotation with a light force applied to the actuator. At the transition point, the switch may temporarily stall rotation as the operator increases the force applied. Once the force applied by an operator is sufficient to overcome the mechanical linkage and the internal linkage transitions states, the actuator may jump forward through the rest of the rotation because the required force to travel over the remaining distance is less than the force required at the transition point.

Thus, it would be desirable to provide a mechanical linkage within a switch that provides for smoother operation over an extended range of motion of the actuator.

It would also be desirable to provide a mechanical linkage within a switch that provides a reduced level of torque be applied to the actuator over the extended range of motion, such that the switch provides a more uniform and easier operational feel during actuation.

BRIEF DESCRIPTION

According to one embodiment of the invention, an apparatus for a switch includes a first rotational member, a second rotational member, and a transfer member. The first rotational member includes a first engagement portion and a first coupling portion. The first engagement portion is configured to receive a force applied to the switch, and the first rotational member moves between a first position and a second position responsive to receiving the force applied to the switch. The second rotational member includes a second coupling portion and a second engagement portion. The second rotational member moves between a third position and a fourth position responsive to receiving the force applied to the switch. The transfer member includes a third coupling portion configured to engage the first coupling portion of the first rotational member and a fourth coupling portion configured to selectively engage the second coupling portion of the second rotational member. The transfer member receives the force applied to the switch from the first rotational member via the third coupling portion and transfers the force applied to the switch to the second rotational member via the fourth coupling portion. The transfer member is configured to move between a fifth position and a sixth position responsive to the first rotational member moving between the first position and the second position.

According to another embodiment of the invention, a method for reducing a force applied to a switch includes applying a first force to a rotary actuator of a switch in a first direction and applying a second force to the rotary actuator of the switch in a second direction. The first force causes the switch to transition between an Off position and an On position, and the second force causes the switch to transition between the On position and the Off position. The first force is applied over a first range of motion of the rotary actuator, and the second force is applied over a second range of motion of the rotary actuator, where the first range of motion is greater than the second range of motion.

According to still another embodiment of the invention, a switching device for industrial equipment having at least one pair of contacts includes a transfer member, a rocker arm, a plunger, and a mechanical linkage. The transfer member is mounted in the switching device, and the transfer member is configured to receive a first force applied to the switching device in a first direction and to receive a second force applied to the switching device in a second direction. The rocker arm is rotatably mounted in the switching device. The rocker arm engages the transfer member to receive the first force over a first angle of rotation, and the rocker arm receives the second force over a second angle of rotation, where the second angle of rotation is less than the first angle of rotation. The plunger is actuated to selectively open and close at least one pair of contacts in the switching device when the switching device is moved between the Off position and the On position. The mechanical linkage is operatively connected between the rocker arm and the plunger. The mechanical linkage engages the plunger to selectively close the at least one pair of contacts as the rocker arm moves over the first angle of rotation, and the mechanical linkage engages the plunger to selectively open the at least one pair of contacts as the rocker arm moves over the second angle of rotation.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
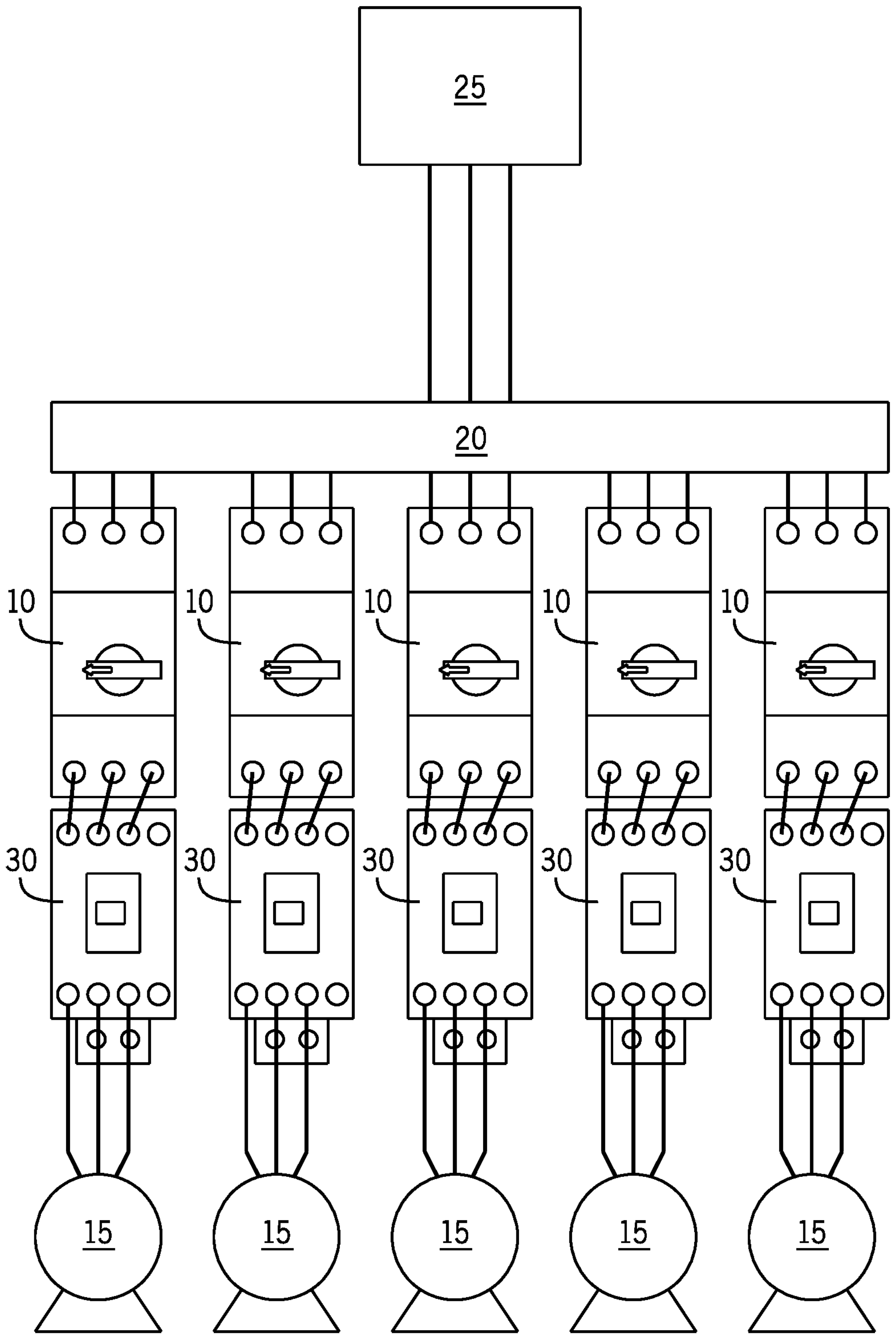
FIG. 1 is a schematic representation of multiple motors connected to a power distribution bus via a contactor and a circuit breaker incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a mechanical linkage within a switch that provides for smoother operation over an extended range of motion of the actuator. The mechanical linkage includes a transfer member configured to receive the force applied to a rotary handle of the switch. The transfer member is slidably mounted within the switch. In an Off position, the transfer member engages a rocker arm. As the transfer member rotates between the Off and On positions, the transfer member causes the rocker arm to rotate between the Off and On positions. When the rocker arm has reached the On position, the transfer member is slidably moved away from the rocker arm, disengaging the rocker arm. As the rocker arm rotates along with the transfer member between the Off and On positions, the rocker arm engages a mechanical linkage connected between the rocker arm and a plunger. The plunger moves in a first direction and closes the electrical contacts of the switch, causing the switch to transition between the Off and On states.

When the switch is transferred from the On state back to the Off state, a boss engages a slot in the rocker arm. The boss begins applying the rotational force in the opposite direction to the slot in the rocker arm. As the rocker arm begins rotating from the On state to the Off state, the mechanical linkage begins transitioning back to the Off state. After a short period of rotation, the rocker arm and mechanical linkage transition from a stable position to a position in which at least one spring in the switch applies a force to and causes the mechanical linkage to jump back to the Off state. The mechanical linkage returning to the Off state, in turn, causes the rocker arm to also jump back to the Off state. The handle of the switch continues rotating to the Off state. When the handle of the switch reaches the Off state, the transfer member slides back toward the rocker arm and reengages the rocker arm. This combination of transfer member, rocker arm, and mechanical linkage results in a reduced level of torque required to rotate the actuator over the extended range of motion when transitioning from the Off state to the On state. The reduced level of torque, in turn, provides a more uniform and easier operational feel during actuation. The jump back to the Off state provides a quick disconnection of the internal contacts and a reduce force required to rotate the handle back to the Off state.

Turning initially to FIG. 1, electrical switches 10 may be mounted in a cabinet and used to control industrial equipment. Group installation allows multiple motors 15 or other loads to be connected to a single branch circuit protection device 20. A power supply 25 supplies power to the branch circuit protection device 20, and power is distributed from the branch circuit protection device 20 to each of the branch circuits. According to the illustrated embodiment, each branch circuit includes a circuit breaker 10 and a contactor 30 connected between the branch circuit protection device 20 and a motor 15. Each circuit breaker 10 is configured to be manually actuated while each contactor 30 is configured to be electronically actuated.

Figure 2:
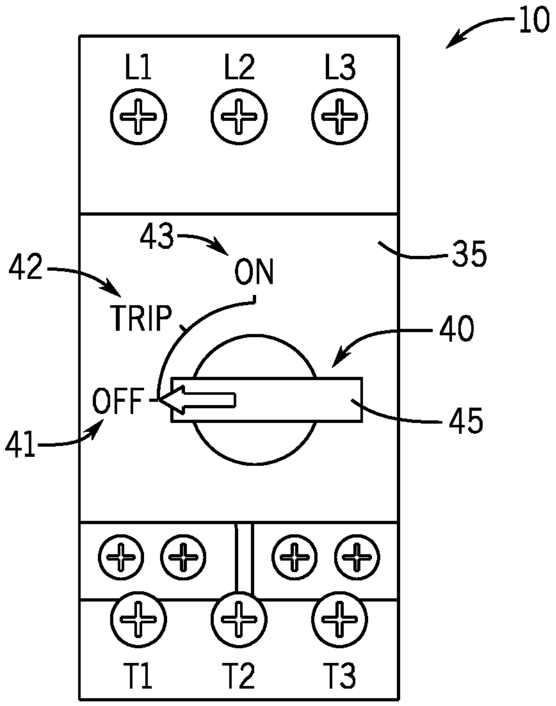
FIG. 2 is a front elevation view of a circuit breaker incorporating one embodiment of the invention.
Figure 3:
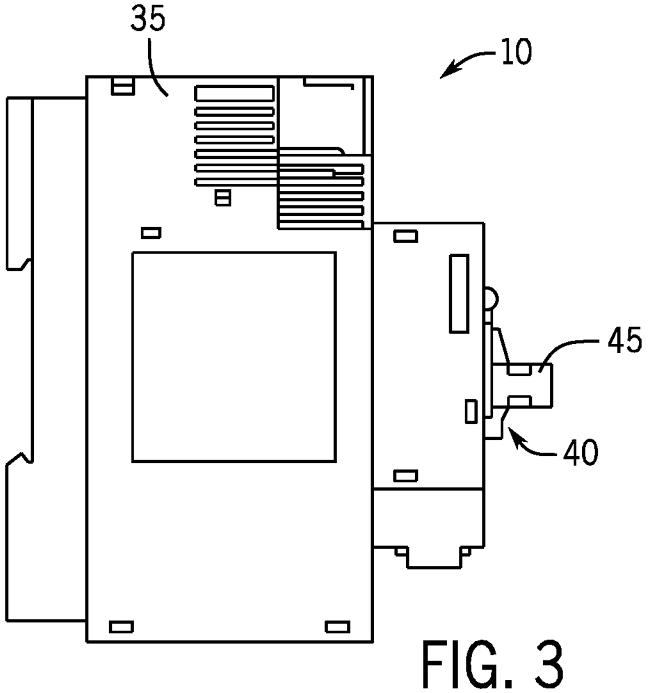
FIG. 3 is a side elevation view of the circuit breaker of FIG. 2.

As illustrated in FIGS. 2 and 3, the circuit breaker is an electrical switch 10 including a housing 35 with an opening extending through a front surface of the housing. A rotary actuator 40 extends through the opening, providing a switch handle 45 external to the housing 35. The switch handle 45 is rotatable between an Off position 41 and an On position 43. An additional, Trip position 42 is located between the Off position 41 and the On position 43, providing an indication to a technician when the circuit breaker has tripped. An inner rotational member 47 couples to the switch handle 45 and receives a force applied to the switch handle. Rotation of the switch handle 45 between the Off position 41 and the On position 43 similarly causes the inner rotational member 47 to transition between a first position and a second position. The inner rotational member 47 engages a mechanical linkage 50 (see FIG. 4) which, in turn, causes the contacts 55 in the circuit breaker to selectively open and close in the Off and On positions, respectively.

Figure 4:
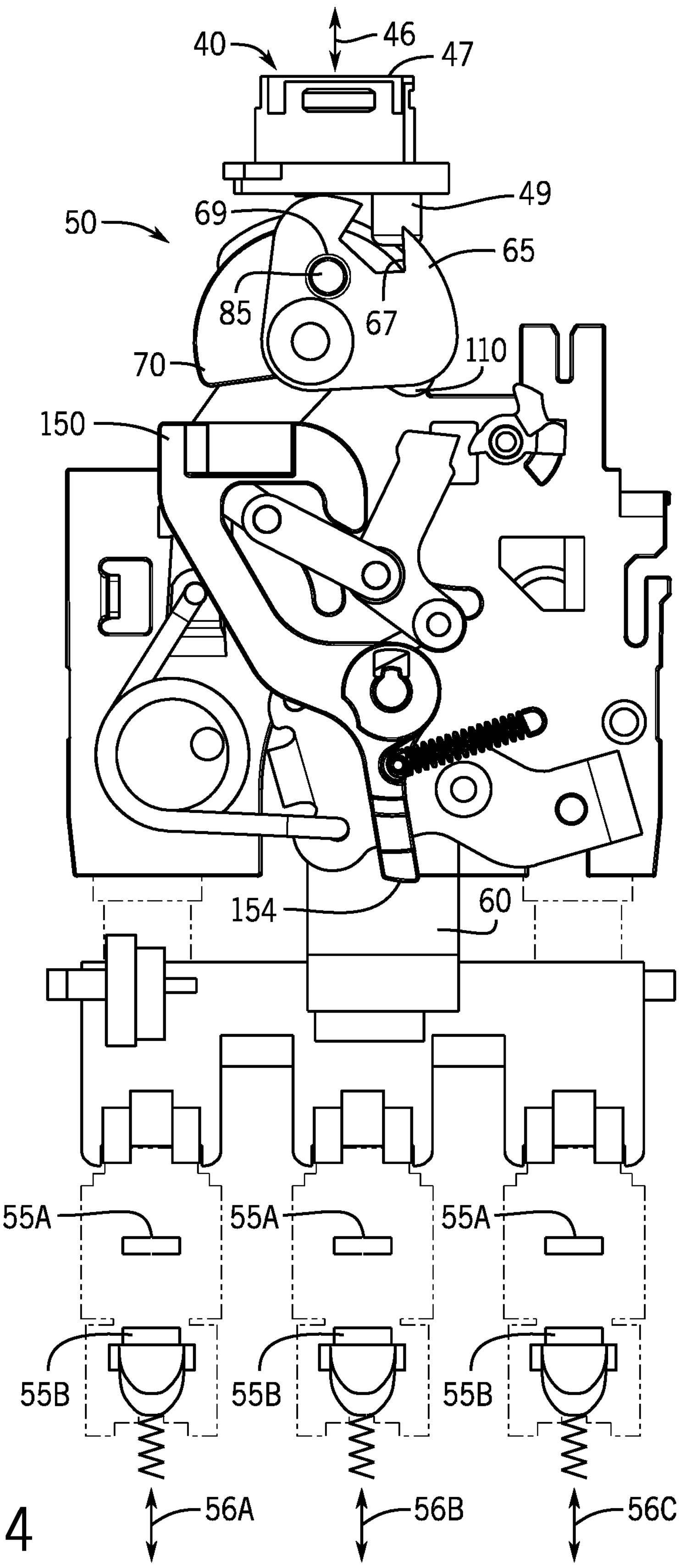
FIG. 4 is a partial side view of the circuit breaker of FIG. 2 in an Off position with the housing removed.
Figure 5:
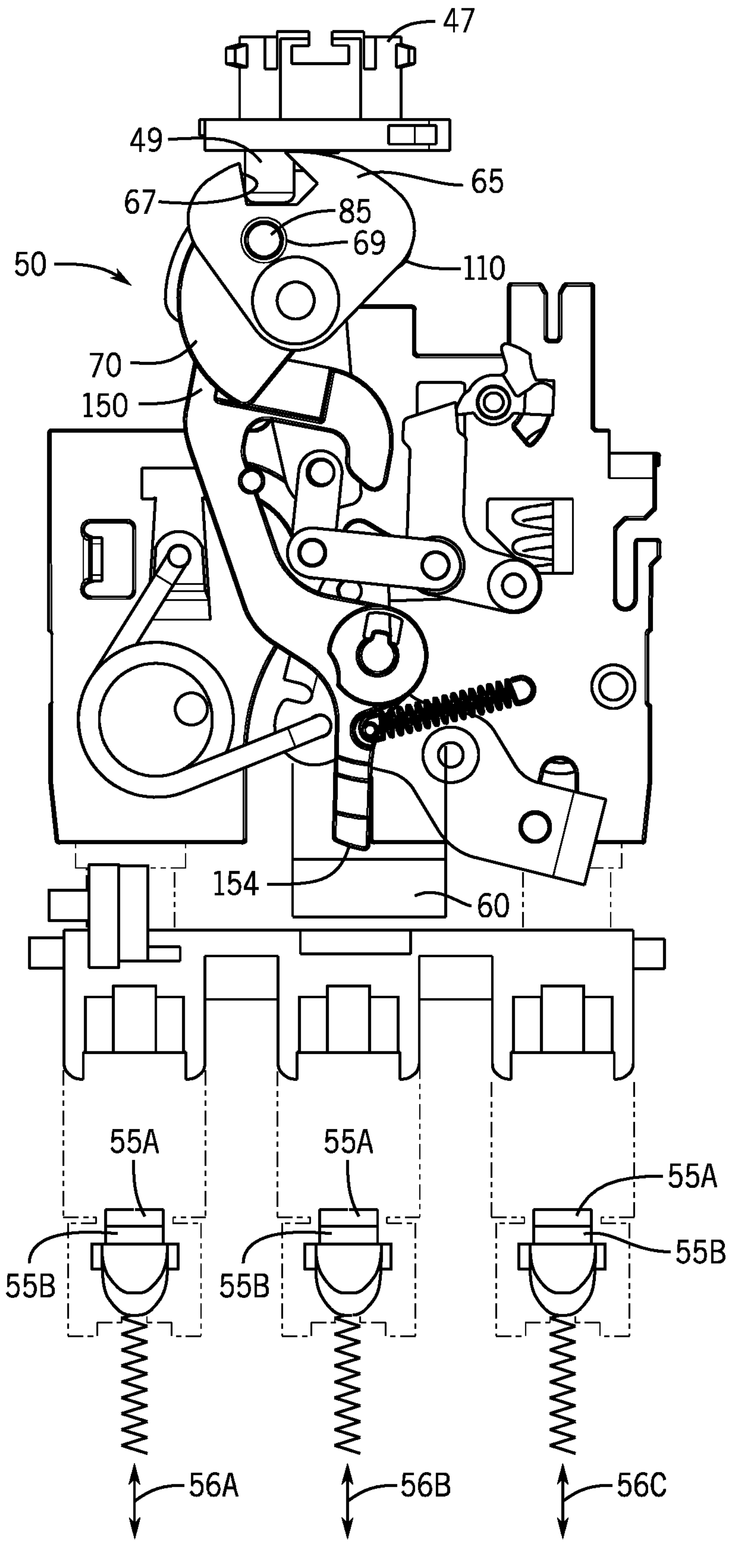
FIG. 5 is a partial side view of the circuit breaker of FIG. 2 in an On position with the housing removed.
Figure 15:
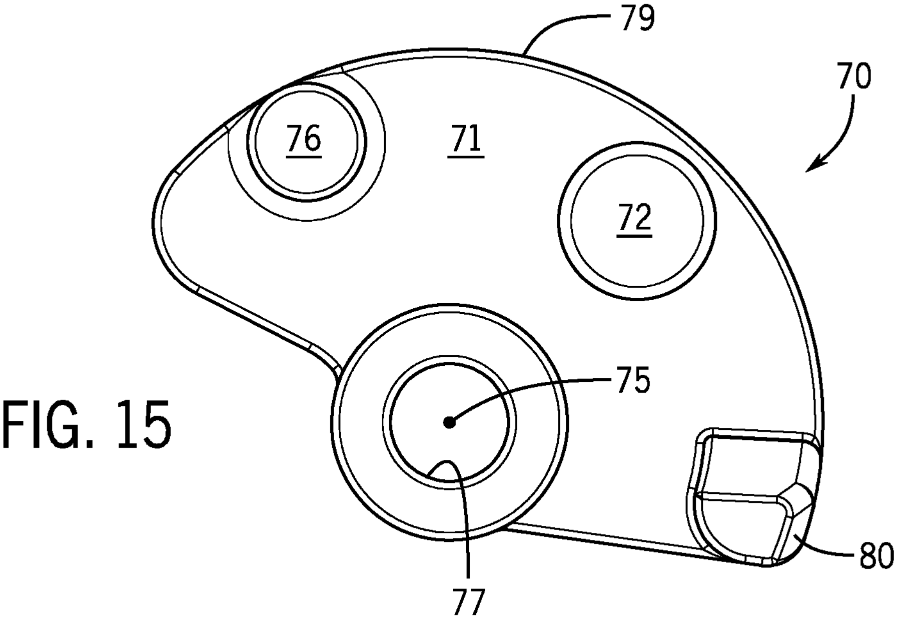
FIG. 15 is a left, side view of the transfer member for the switching mechanism of FIG. 6.
Figure 16:
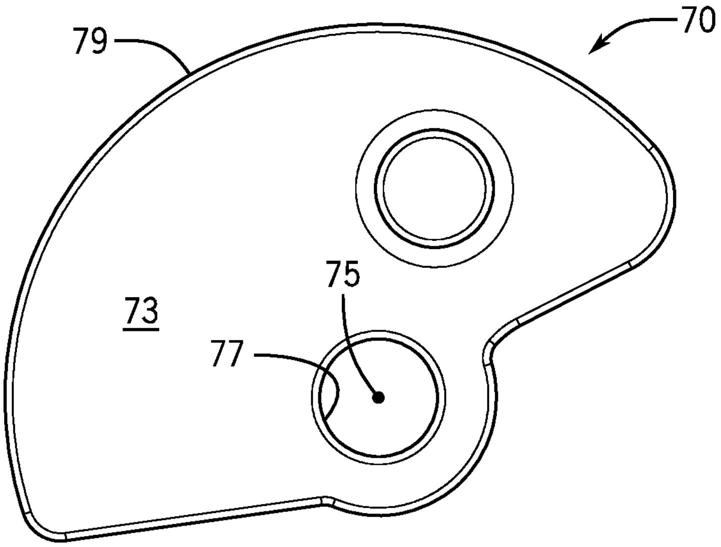
FIG. 16 is a right, side view of the transfer member for the switching mechanism of FIG. 6.
Figure 17:
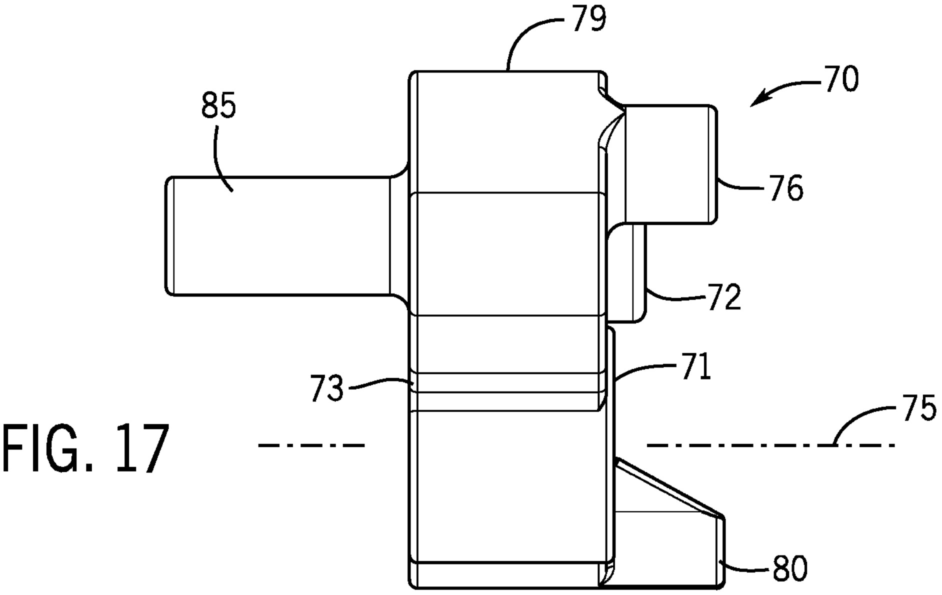
FIG. 17 is a top plan view of the transfer member for the switching mechanism of FIG. 6.
Figure 18:
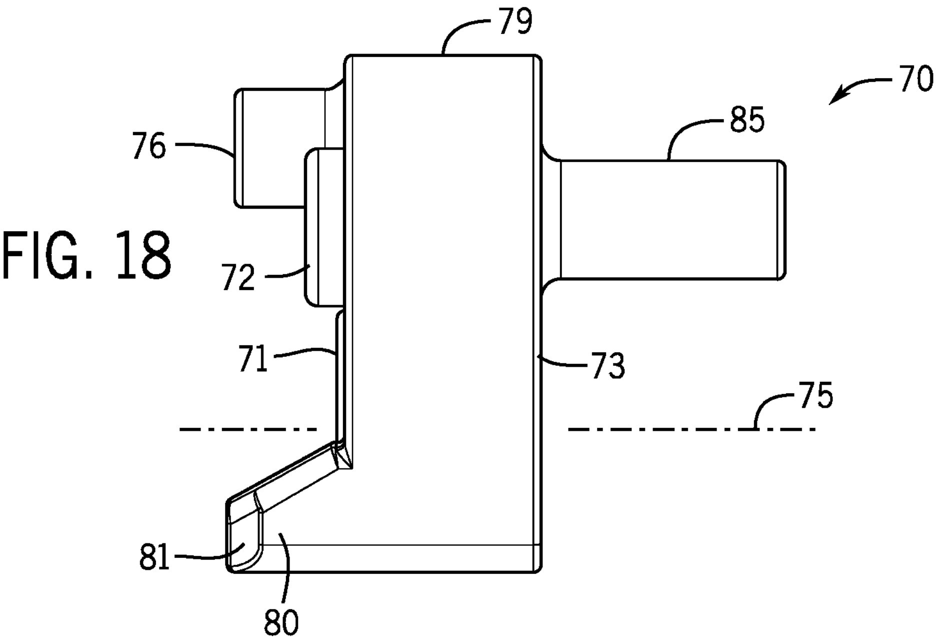
FIG. 18 is a bottom plan view of the transfer member for the switching mechanism of FIG. 6.
Figure 19:
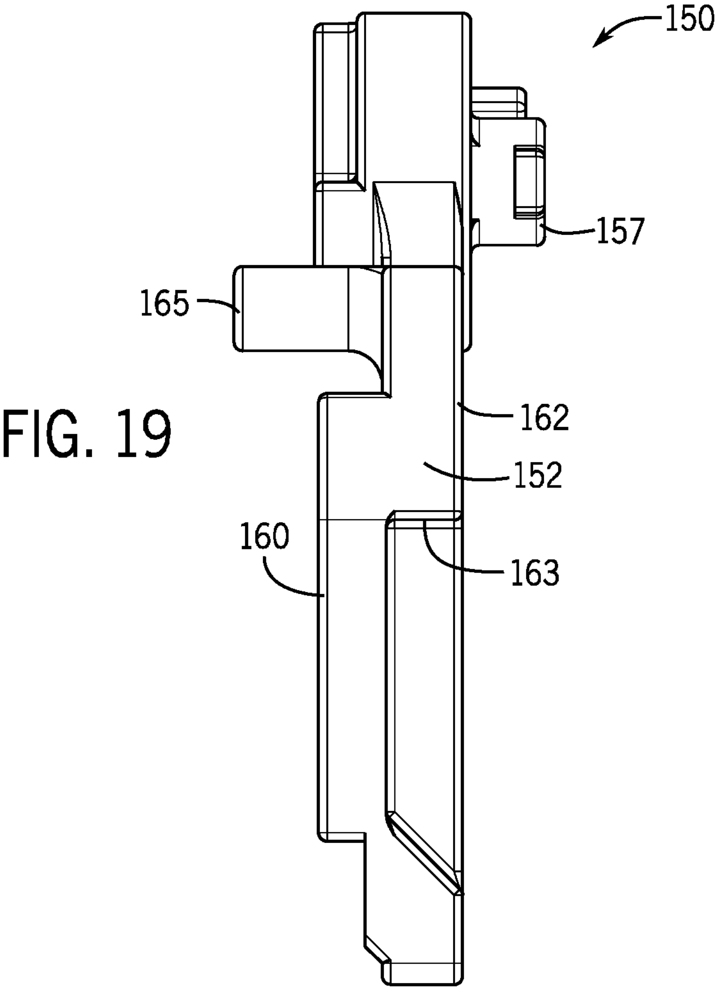
FIG. 19 is a top plan view of a lever arm for the switching mechanism of FIG. 6.
Figure 20:
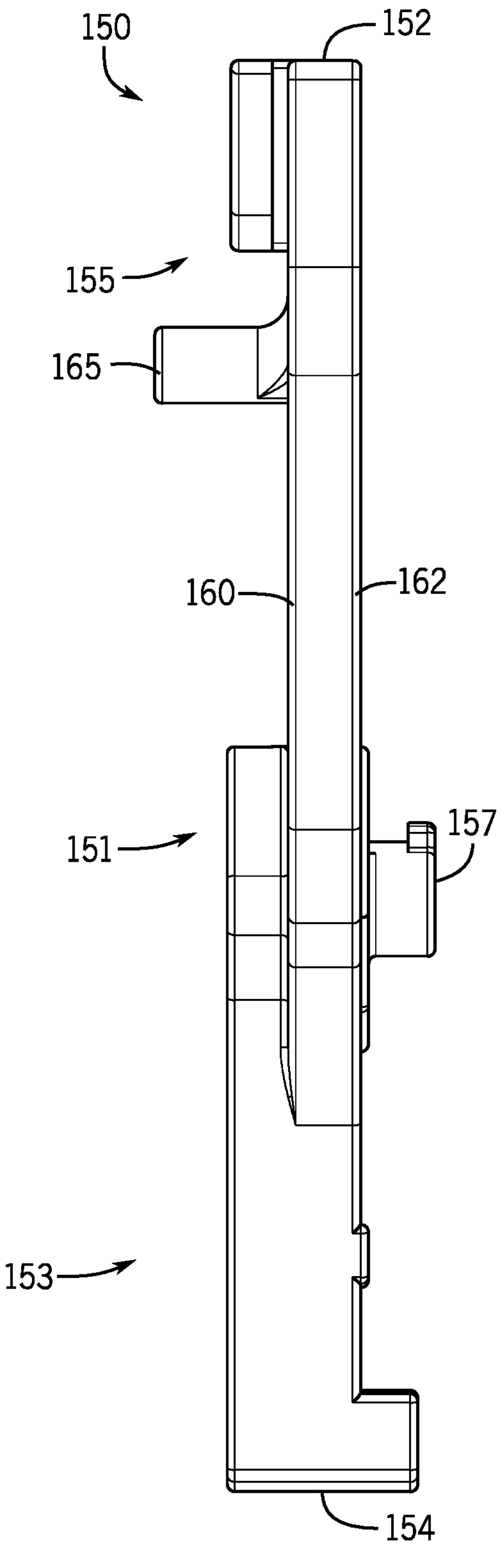
FIG. 20 is a rear elevation view of the lever arm for the switching mechanism of FIG. 6.
Figure 21:
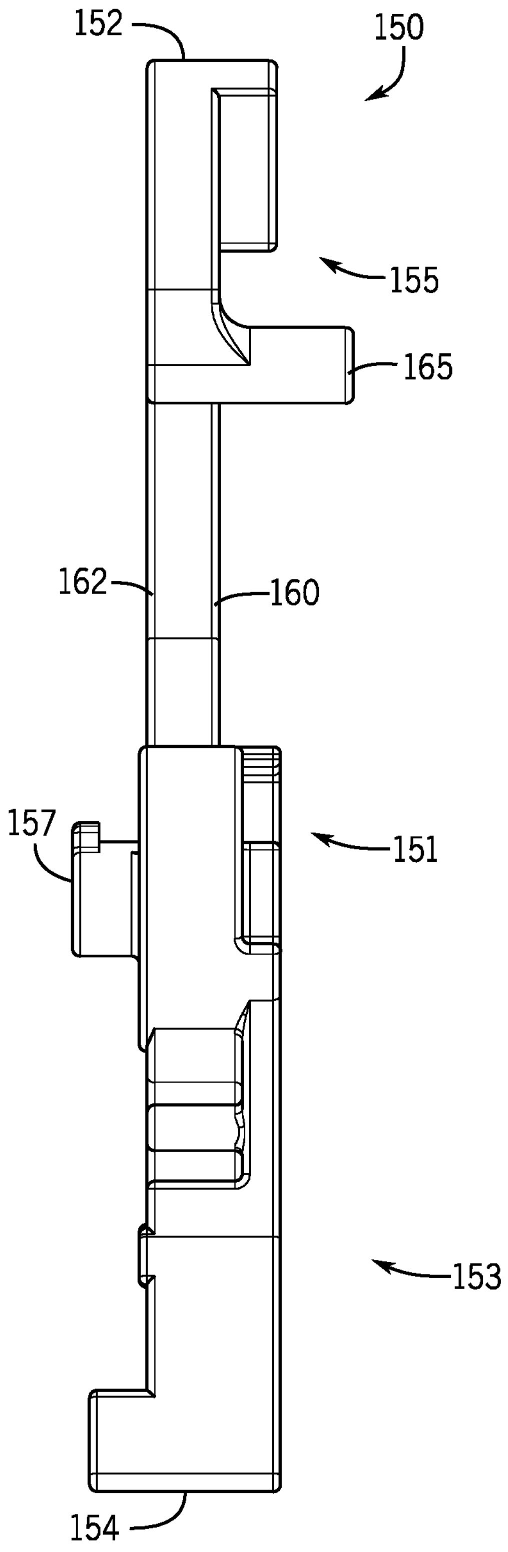
FIG. 21 is a front elevation view of the lever arm for the switching mechanism of FIG. 6.
Figure 22:
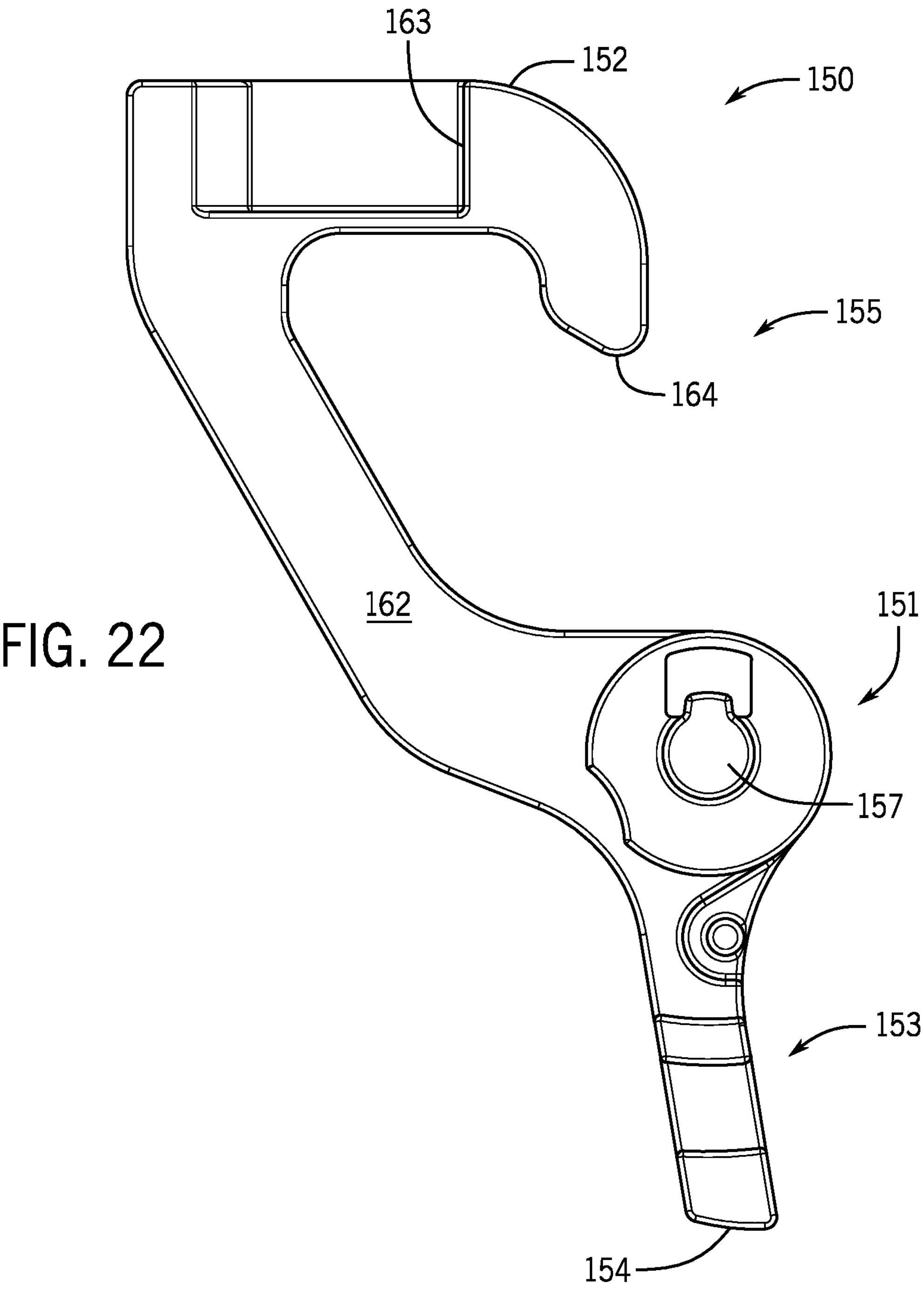
FIG. 22 is a right, side view of the lever arm for the switching mechanism of FIG. 6.
Figure 23:
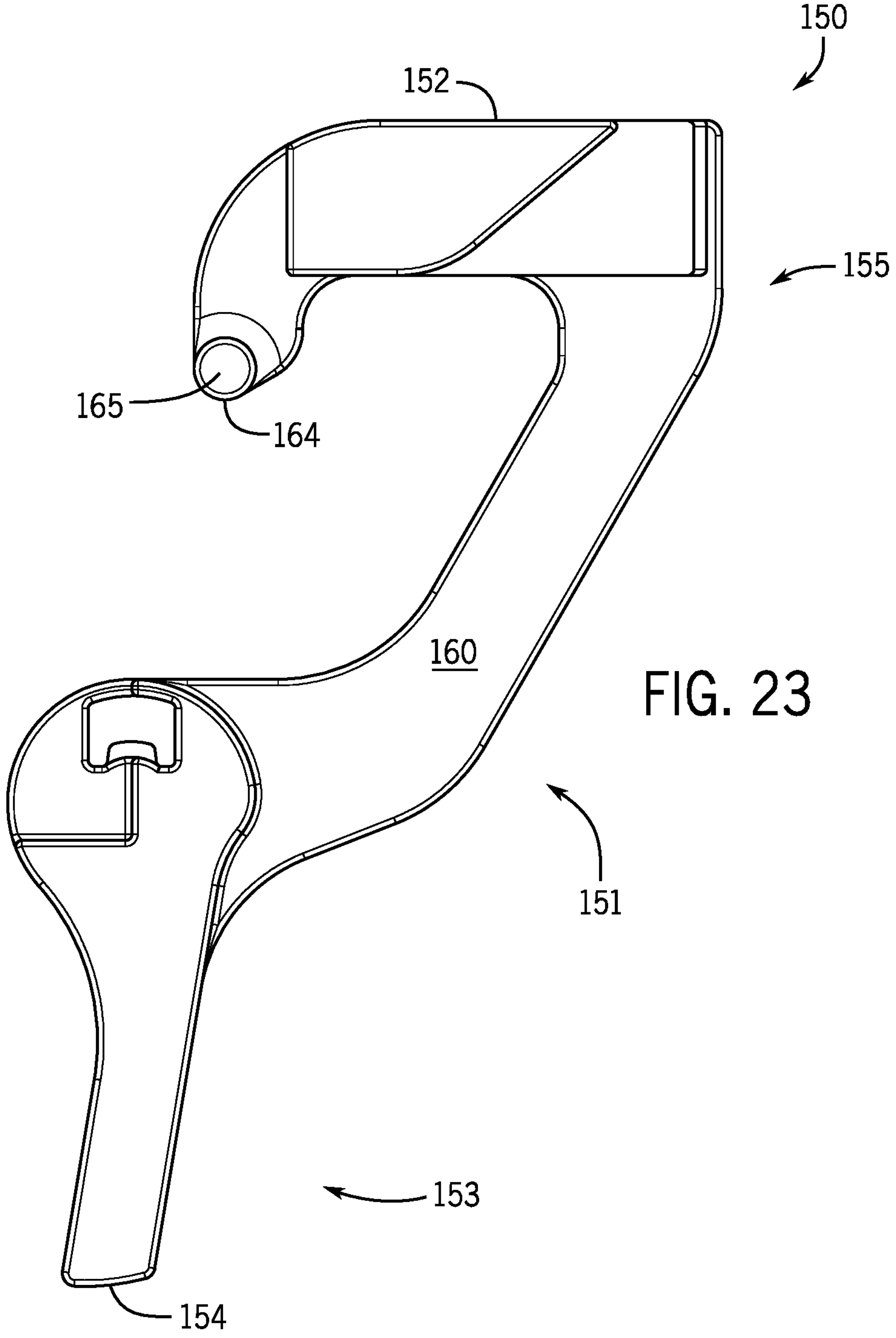
FIG. 23 is a left, side view of the lever arm for the switching mechanism of FIG. 6.

With reference next to FIGS. 4 and 5, one embodiment of the circuit breaker 10 is illustrated in an Off state (FIG. 4) and an On state (FIG. 5). The mechanical linkage 50 includes a gear 65 which is rotatably mounted within the switch. The gear 65 includes a single gap 67 configured to receive a complementary tooth 49 extending from the inner rotational member 47 of the rotary actuator. It is another aspect of the invention, that the tooth and gap may be mounted in an opposite configuration, such that a tooth (not shown) may extend from the gear 65 and engage a gap (not shown) on the inner rotational member 47. In either configuration, rotation of the inner rotational member 47 in a first plane causes rotation of the gear 65 in a second plane. The gear 65 is mounted with an axis of rotation 75 orthogonal to an axis of rotation 46 of the rotary actuator. The engagement of the tooth 49 with the gap 67 translates the torque received by the rotary actuator about the first axis of rotation 46 to the gear 65 for rotation about the second axis of rotation 75. A first opening 69 in the gear 65 is configured to receive a boss 85 from a transfer member 70 which is also rotatably mounted within the switch. A second opening 68 in the gear 65 is configured to align with an opening 77 (see also FIG. 15) in the transfer member 70. A mounting pin 57 (see also FIG. 6) may be inserted through the openings 68, 77 in the gear 65 and transfer member 70, respectively, such that the gear and transfer member are rotatably mounted around the same axis of rotation 75 within the switch.

Figure 6:
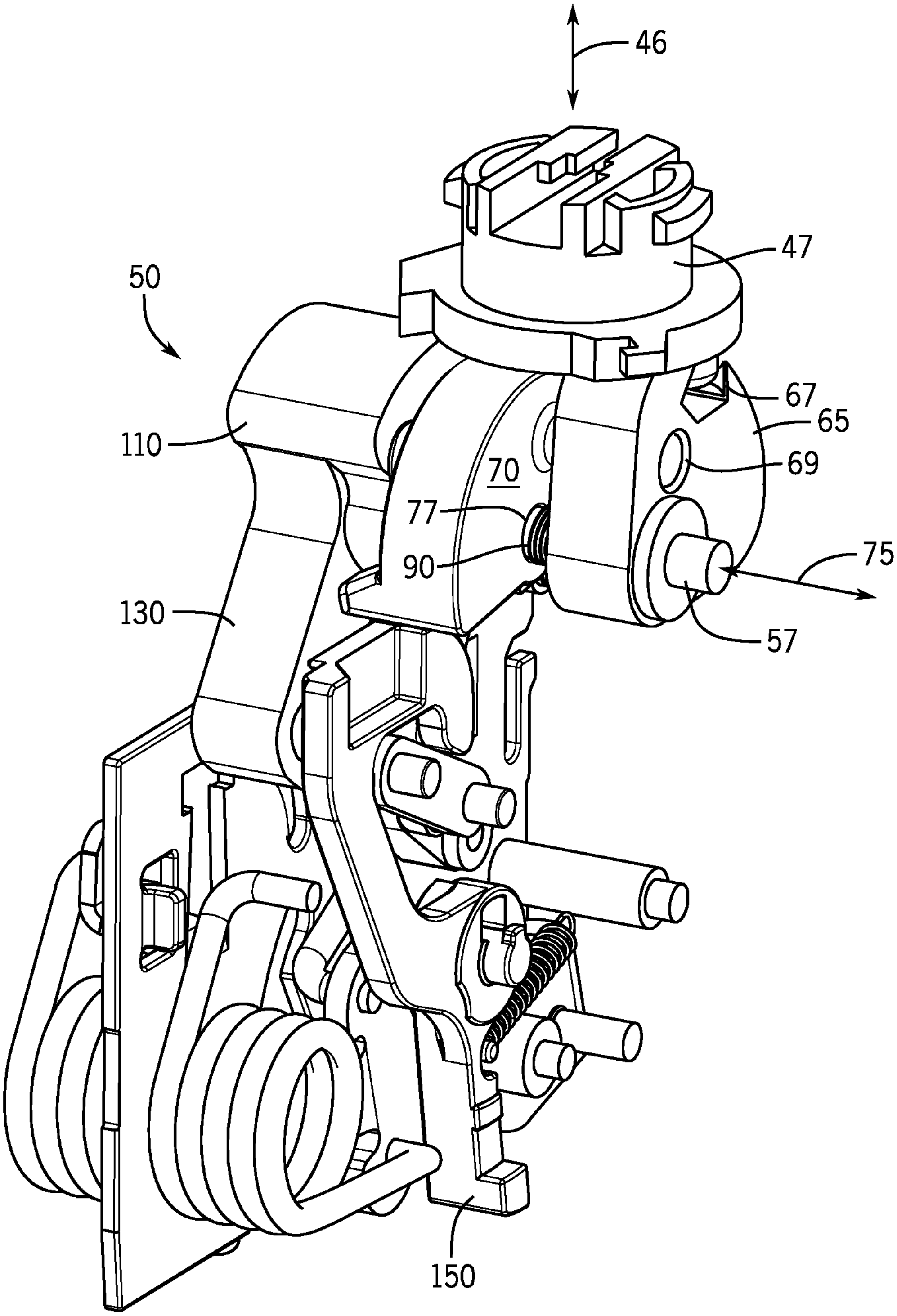
FIG. 6 is a partial perspective view of a switching mechanism in the circuit breaker of FIG. 2 from the front, bottom, and side.

As further illustrated in FIG. 6, a rocker arm 110 is still another rotational member mounted within the switch. The rocker arm 110 includes an opening 115 (see also FIG. 7) which may also be aligned with the openings 68, 77 in the gear 65 and transfer member 70, respectively, such that the gear 65, transfer member 70, and rocker arm 110 are all mounted within the switch by the mounting pin 57 and each of the gear 65, transfer member 70, and rocker arm 110 rotate about the same axis of rotation 75. As will be discussed in more detail below, the transfer member 70 is configured to engage the rocker arm 110 as the transfer member 70 rotates between an Off position and an On position. Rotation of the transfer member 70, in turn, causes rotation of the rocker arm 110. The rocker arm 110 engages a lever arm 150 pivotally mounted within the switch.

The switch 10 also includes a plunger 60 configured to move reciprocally, back-and-forth, along an axis 56. According to the illustrated embodiment shown in FIGS. 4 and 5, the switch 10 is a three-phase switch, where a plunger 60 moves three prongs up and down in three parallel axes 56A, 56B, 56C. A first end of the plunger 60 engages an end 154 of the lever arm 150 and a second end of the plunger includes each of the three prongs to reciprocally move a lower contact 55B along the respective axis 56. It is contemplated that the end of the prong may fit into a plunger seat or, optionally directly engage the lower contact 55B. As the plunger 60 is moved in a downward direction, the lower contact 55B separates from the upper contact 55A, opening the circuit and putting the switch into the Off state. As the plunger 60 moves in an upward direction, the lower contact 55B engages the upper contact 55A, establishing an electrical connection between the contacts 55 and putting the switch into the On state.

The illustrated plunger 60 is intended to be exemplary only. It is contemplated that multiple plungers 60 may be mechanically connected or formed as a single member to open and close multiple contacts 55 in tandem. It is further contemplated that the geometry of the plunger 60 may take other forms or the plunger 60 may include an offset segment along the length of the plunger such that a force is applied at a first end of the plunger 60 along a first axis and the second end of the plunger 60 moves reciprocally along a second axis where the second axis is parallel to but offset from the first axis.

Although illustrated as a circuit breaker, the rotary actuator 40 and mechanical linkage 50 may be implemented on other switching devices such as a motor protection circuit, an electrical contactor, or the like. Terms such as upper, lower, inner, outer, front, rear, left, right, and the like will be used herein with respect to the illustrated switching device 10. These terms are relational with respect to the illustrated switching device and are not intended to be limiting. It is understood that the switching device 10 may be installed in different orientations, such as vertical or horizontal, or may be rotated one hundred eighty degrees without deviating from the scope of the invention.

Figure 24:
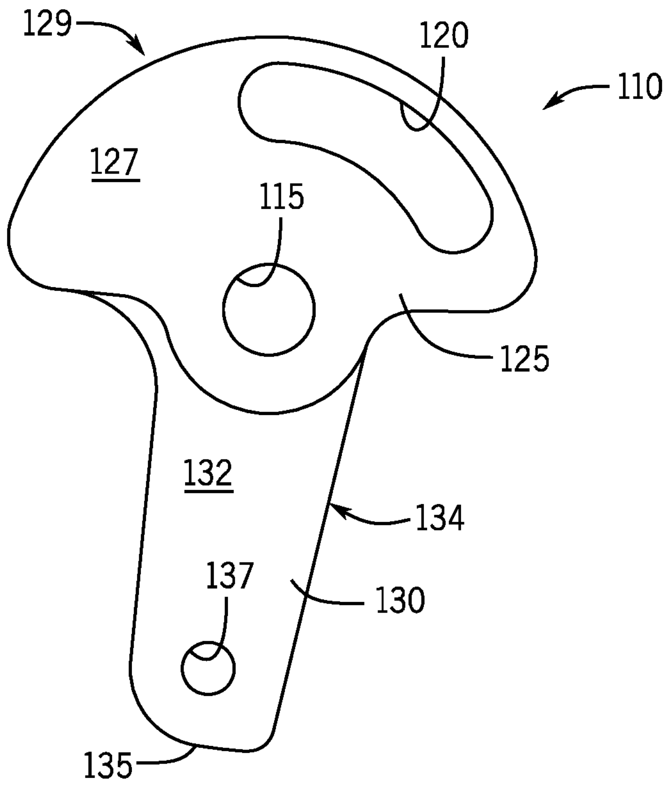
FIG. 24 is a right, side view of a rocker arm for the switching mechanism of FIG. 6.
Figure 25:
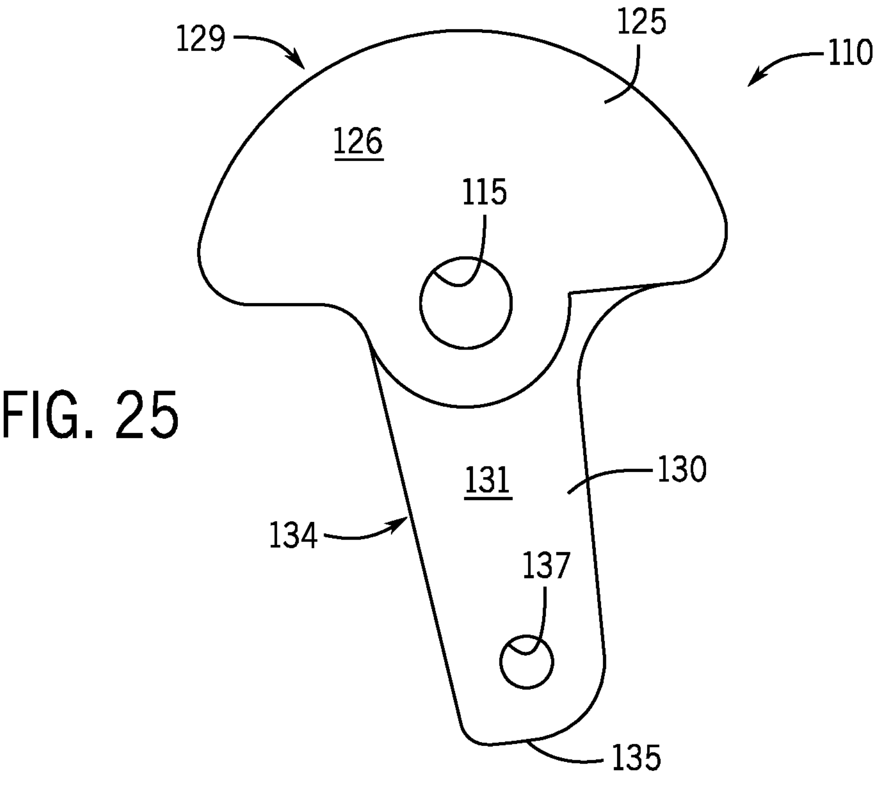
FIG. 25 is a left, side view of the rocker arm for the switching mechanism of FIG. 6.
Figure 26:
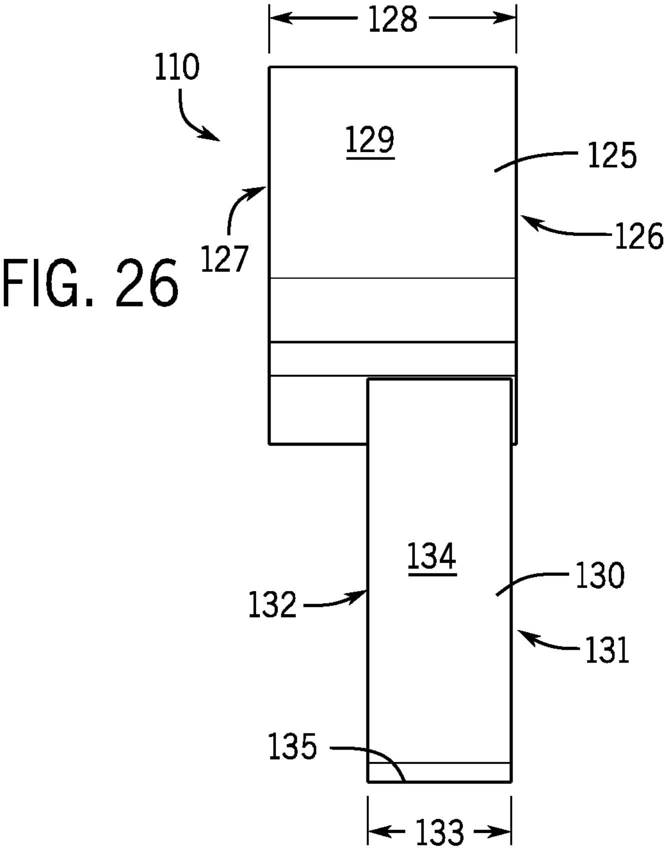
FIG. 26 is a top plan view of the rocker arm for the switching mechanism of FIG. 6.
Figure 27:
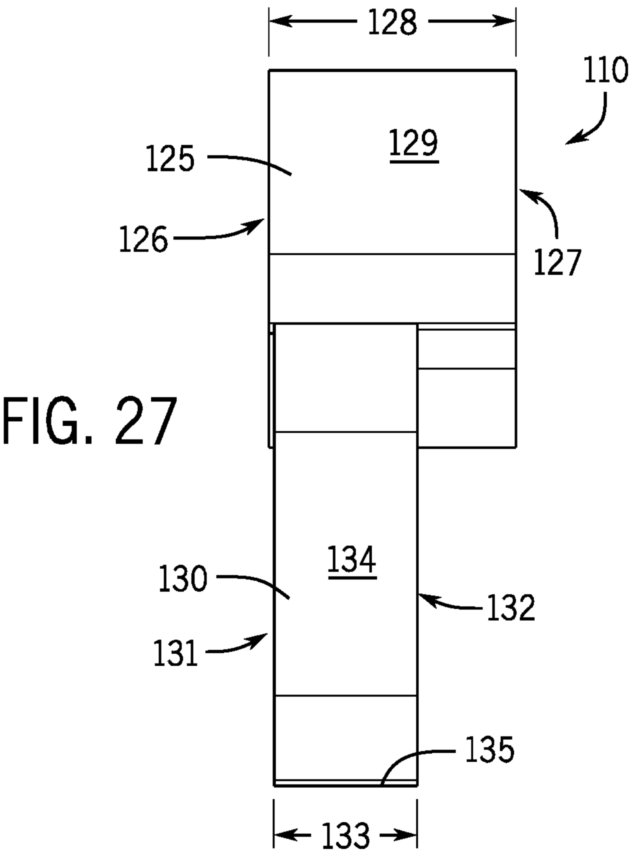
FIG. 27 is a bottom plan view of the rocker arm for the switching mechanism of FIG. 6.
Figure 28:
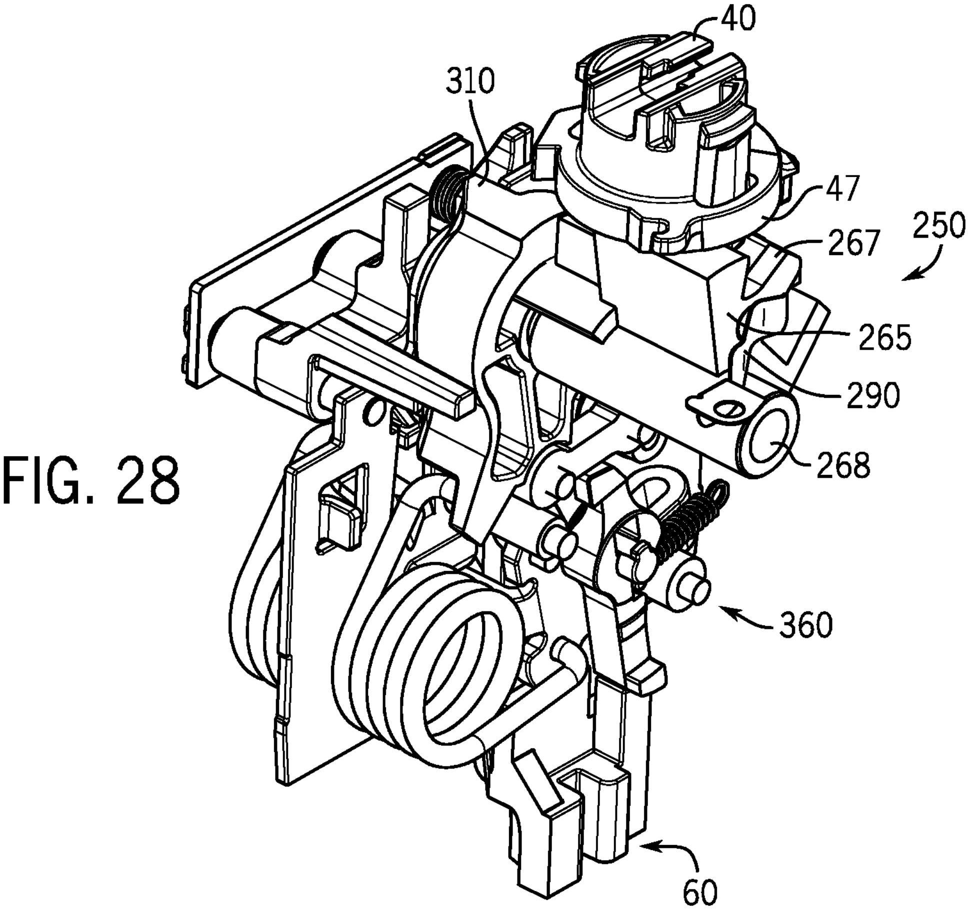
FIG. 28 is a perspective view of a circuit breaker incorporating another embodiment of the invention.

Turning next to FIGS. 14-18, one embodiment of a transfer member 70 is illustrated. The transfer member 70 has a first side 71 and a second side 73 opposite the first side. The transfer member 70 has an irregular geometric outer periphery 79 with generally arcuate surfaces extending between the first and second sides. A first boss protrudes for a first length 74 from the first side 71, and a second boss 76 protrudes for a second length 78 from the first side 71. The second length 78 is greater than the first length 74. The first and second bosses 72, 76 are positioned on the first side such that they engage an elongated slot 120 (see also FIG. 24) in the rocker arm 110 when the transfer member 70 and rocker arm 110 are mounted within the switch 10. The first boss 72 and the second boss 76 are also referred to herein as coupling portions of the transfer member, and the elongated slot 120 is a complementary coupling portion on the rocker arm 110 configured to receive the bosses 72, 76 at least partly within the slot 120. According to the illustrated embodiment, the first boss 72 and the second boss 76 are generally cylindrical. The elongated slot 120 on the transfer member 70 has an arcuate profile such that the bosses 72,76 may slide within the slot 120. It is contemplated that other geometrical shapes may be utilized as long as the shape of the boss 72, 76 and the shape of the slot 120 are complementary such that the boss 72, 76 may be inserted and/or removed from the slot as will be discussed further below. The transfer member 70 also includes a third boss 80 projecting from the first side 71. The third boss 80 is referred to herein as an engagement member. The third boss 80 further includes an engagement surface 81 which is sloped with respect to an edge of the lever arm 150 with which it will engage. The transfer member 70 further includes a fourth boss 85 extending from the second side 73. According to the illustrated embodiment, the fourth boss 85 is generally cylindrical and is configured to slidably engage the opening 69 in the gear 65. Optionally, the fourth boss 85 may have other geometric shapes as long as the opening 69 in the gear 65 has a complementary geometry in which the fourth boss 85 may be slidably received.

Turning next to FIGS. 19-23, one embodiment of a lever arm 150 is illustrated. The lever arm 150 has a first side 160 and a second side 162, where the second side is opposite the first side. The lever arm 150 has an irregular geometric periphery extending between the first and second sides 160, 162. According to the illustrated embodiment, the lever arm 150 is formed as a single member but will be descried herein as three different segments. A first segment is the upper portion 155, a second segment is the middle portion 151, and a third segment is the lower portion 153. The upper portion 155 of the lever arm 150 is generally hook-shaped. The lever arm 150 extends upward from the middle portion 151 toward a first end 152 of the lever arm. At the first end 152 of the lever arm 150, the upper portion 155 curls back on itself forming the hook portion of the lever arm. A recess-portion 163 extends along a portion of the second side 162 of the lever arm at the first end 152 before the upper portion 155 bends back toward the middle portion 151. At an end 164 of the hook portion, an engagement member 165 protrudes from the first side 160 of the upper portion 155. According to the illustrated embodiment, the engagement member 165 is generally cylindrical and extends from the first side 160 a sufficient distance to engage with the rocker arm 110, as will be discussed in more detail below. The middle portion 151 of the lever arm 150 includes a pivotal mount 157 protruding from the second side 162 of the lever arm. The pivotal mount 157 is fit through an opening in a side plate (not shown) of the switch and a pin or clip is used to secure the lever arm 150 to the side plate. The lever arm 150 pivots about the pivotal mount 157 within the switch 10 as it moves between an Off state and an On state. The lower portion 153 of the lever arm is an elongated member and is configured to engage a plunger within the switch. In an Off state, the lower portion 153 holds the plunger in a down, or extended position, such that the contacts 55 in the switch are open. In the On state, the lower portion 153 releases the plunger and springs in the switch push the plunger upward, or in a retracted position, such that the contacts 55 in the switch close, establishing an electrical connection between upper contacts 55A an lower contacts 55B.

Figure 13:
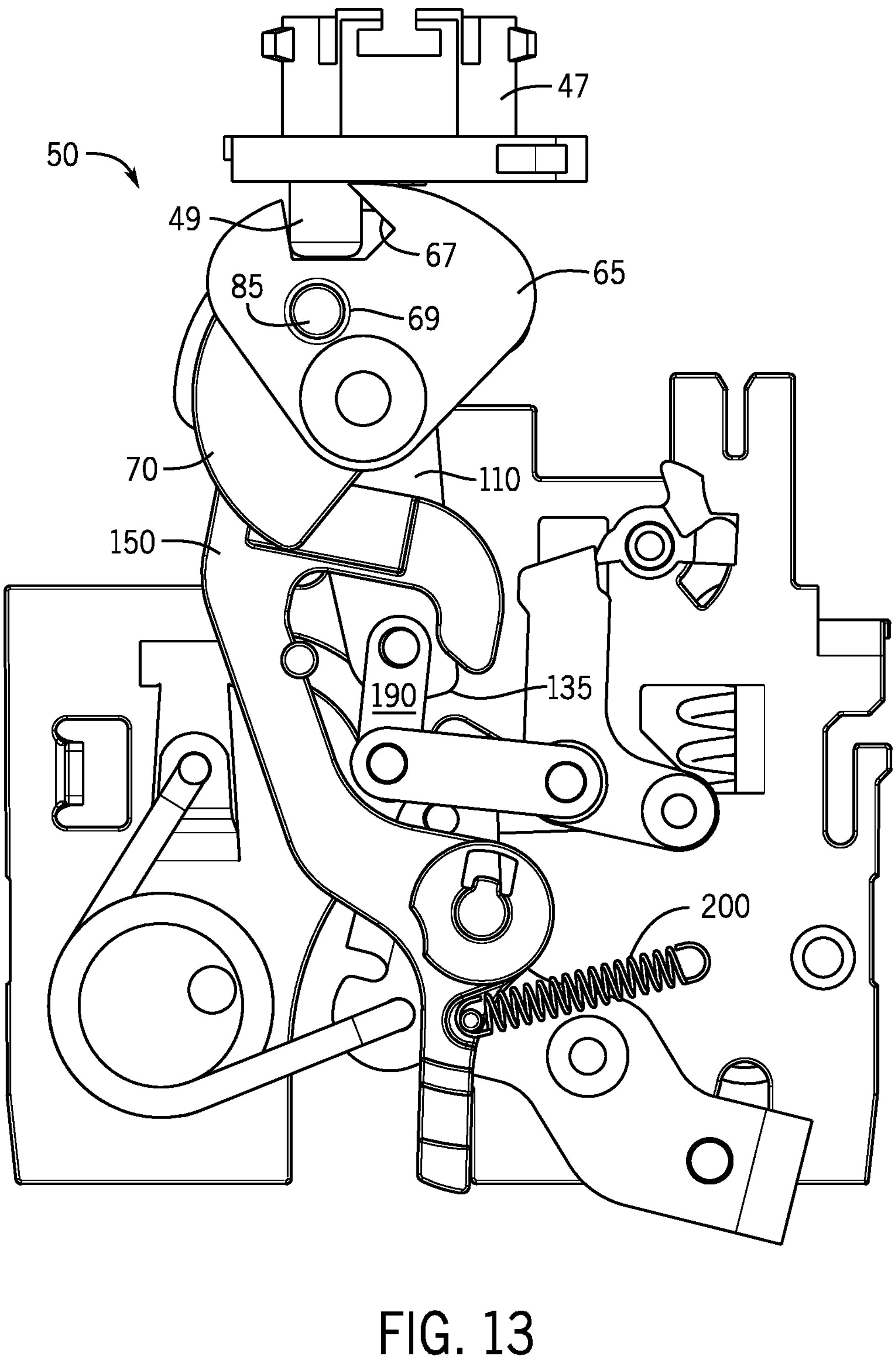
FIG. 13 is a side view of the switching mechanism of FIG. 6 in the On position.
Figure 14:
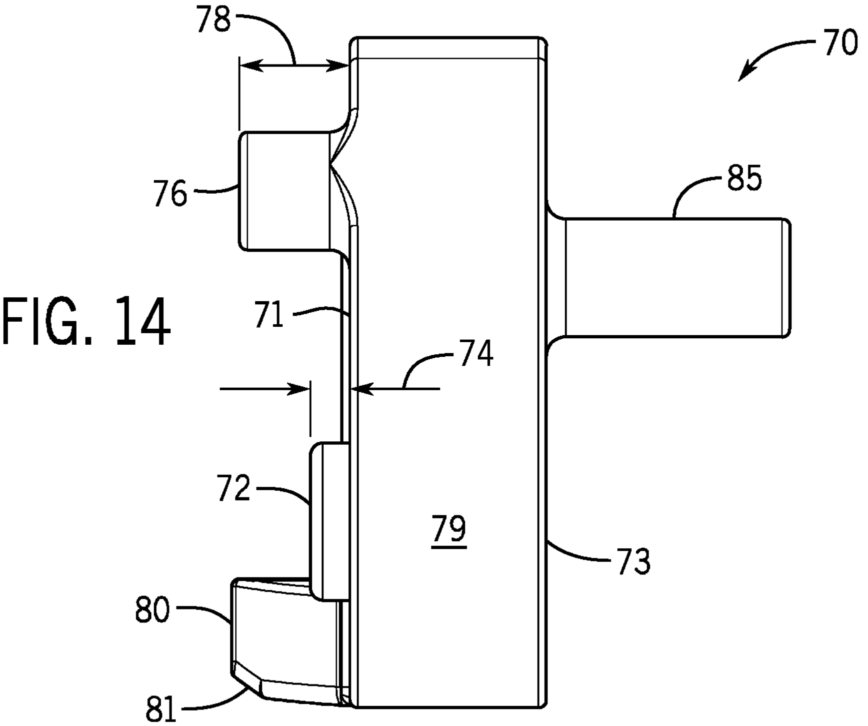
FIG. 14 is a front elevation view of a transfer member for the switching mechanism of FIG. 6.

Turning next to FIGS. 24-27, one embodiment of a rocker arm 110 is illustrated. The rocker arm 110 includes a body portion 125 and an elongated member 130. The body portion 125 includes a first side 126 and a second side 127, where the second side is opposite the first side. Similarly, the elongated member 130 includes a first side 131 and a second side 132, where the second side is opposite the first side. The first side 126 of the body portion 125 is generally parallel to but offset from the first side 131 of the elongated member 130. Similarly, the second side 127 of the body portion 125 is generally parallel to but offset from the second side 132 of the elongated member 130. Each of the body portion 125 and the elongated member 130 have an irregular geometric outer periphery extending between the respective first and second sides. The outer periphery 129 of the body portion 125 has generally arcuate shapes and extends for a first width 128 between the first and second sides 126, 127. The outer periphery 134 of the of the elongated member has a first generally planar segment and a second generally planar segment extending away from the body portion 125, where the width between the first and second generally planar segments is greater proximate the body portion 125 and tapers toward an end 135 distal from the body portion. The end 135 distal from the body portion is generally arcuate in shape. The elongated member 130 has a second width 133, where the second width 133 is less than the first width 128. The body portion 125 further includes the opening 115 extending therethrough by which the rocker arm 110 is mounted within the switch 10. The elongated member 130 includes a second opening 137 extending therethrough near the end 135 distal from the body portion 125. The second opening 137 is configured to be coupled to an arm 190, as seen in FIG. 13.

Turning next to FIGS. 28-31, another embodiment of the circuit breaker is illustrated in the OFF state. The mechanical linkage 250 includes a gear 265 which is rotatably mounted within the switch. The gear 265 includes an opening 268 through which a mounting pin 257 is inserted and about which the gear 265 rotates. The gear 265 includes a single gap 267 configured to receive a complementary tooth 49 extending from the inner rotational member 47 of the rotary actuator 40. It is another aspect of the invention, that the tooth and gap may be mounted in an opposite configuration, such that a tooth (not shown) may extend from the gear 265 and engage a gap (not shown) on the inner rotational member 47. In either configuration, rotation of the inner rotational member 47 in a first plane causes rotation of the gear 265 in a second plane. The gear 265 is mounted with an axis of rotation 75 orthogonal to an axis of rotation 46 of the rotary actuator 40. The engagement of the tooth 49 with the gap 267 translates the torque received by the rotary actuator 40 about the first axis of rotation 46 to the gear 265 for rotation about the second axis of rotation 75. The gear 265 includes an elongated channel 269 configured to receive a transfer member 270. The transfer member 270 is slidably mounted within the elongated channel 269. The transfer member has a first end 272 oriented away from a rocker arm 310 and a second end 274 which selectively engages the rocker arm 310.

The mechanical linkage 250 also includes the rocker arm 310. The rocker arm 310 includes an opening 315 (see also FIG. 38) which is aligned with the opening 268 in the gear 265 and configured to receive the mounting pin 257. The gear 265 and rocker arm 310 are mounted within the switch by the mounting pin 257, and both the gear 265 and rocker arm 310 rotate about the same axis of rotation 75. As will be discussed in more detail below, the transfer member 270, slidably mounted within the gear 265, is configured to engage the rocker arm 310 as the gear 265 rotates between an Off position and an On position. Rotation of the gear 265 and engagement of the transfer member 270, in turn, causes rotation of the rocker arm 310. The rocker arm 310 engages a further mechanical linkage 360 to selectively activate a plunger 60 which, in turn, selectively opens and closes one or more contacts within the switch.

Figure 32:
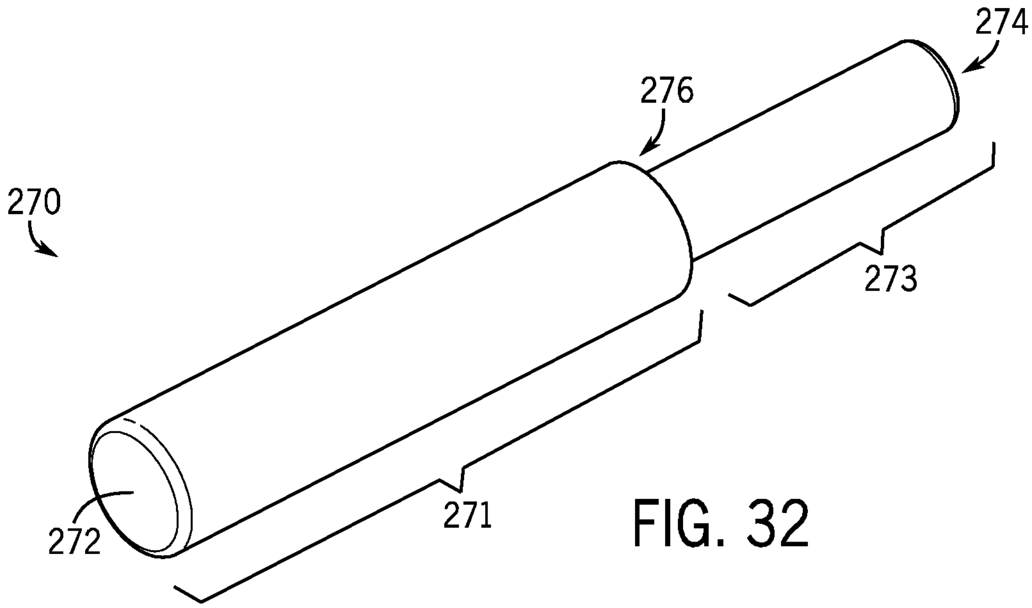
FIG. 32 is a perspective view of a transfer member of the circuit breaker of FIG. 28.
Figure 33:
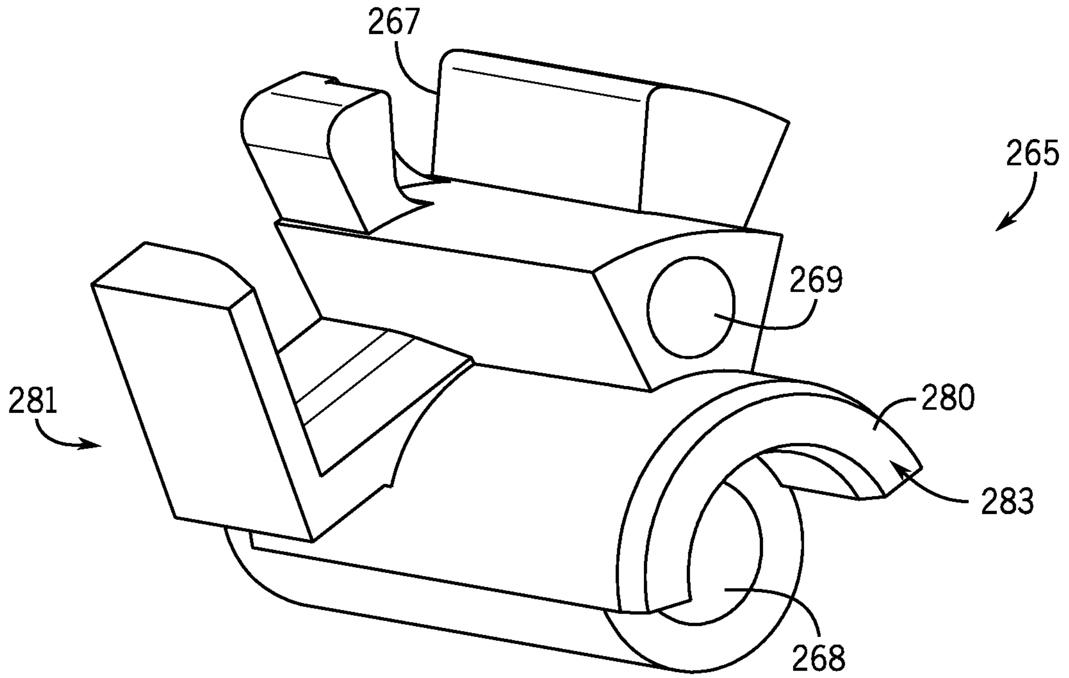
FIG. 33 is a perspective view of a gear for the circuit breaker of FIG. 28.
Figure 34:
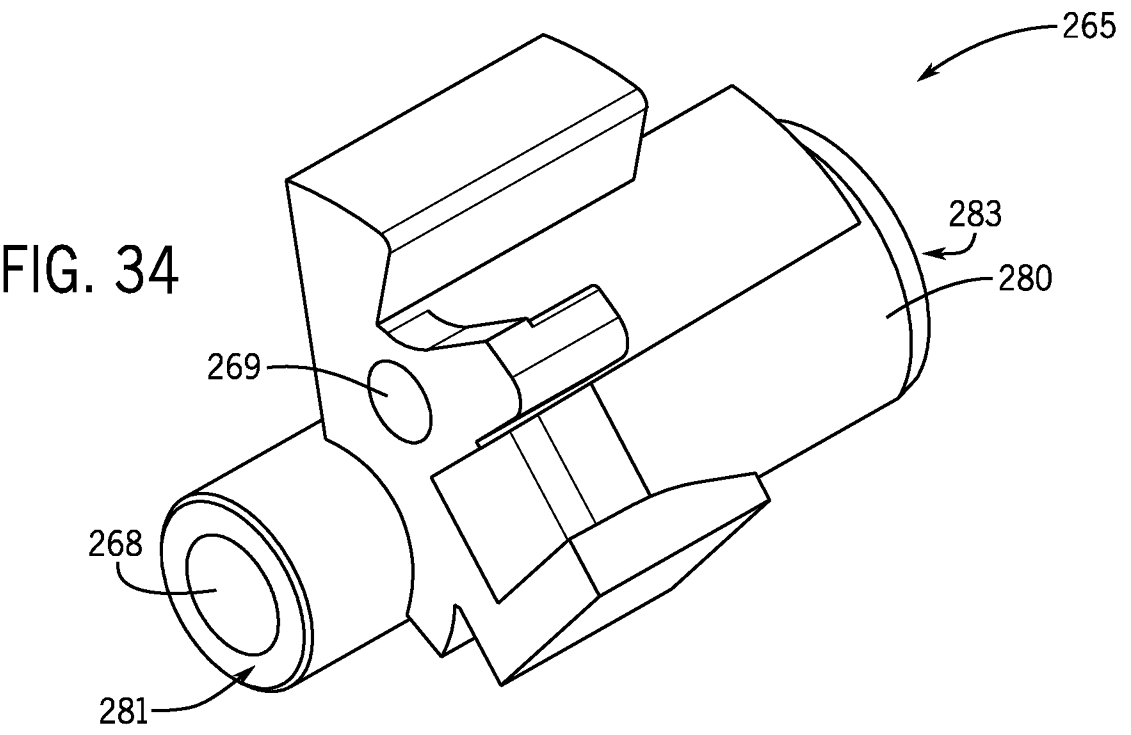
FIG. 34 is another perspective view of the gear of FIG. 33.
Figure 35:
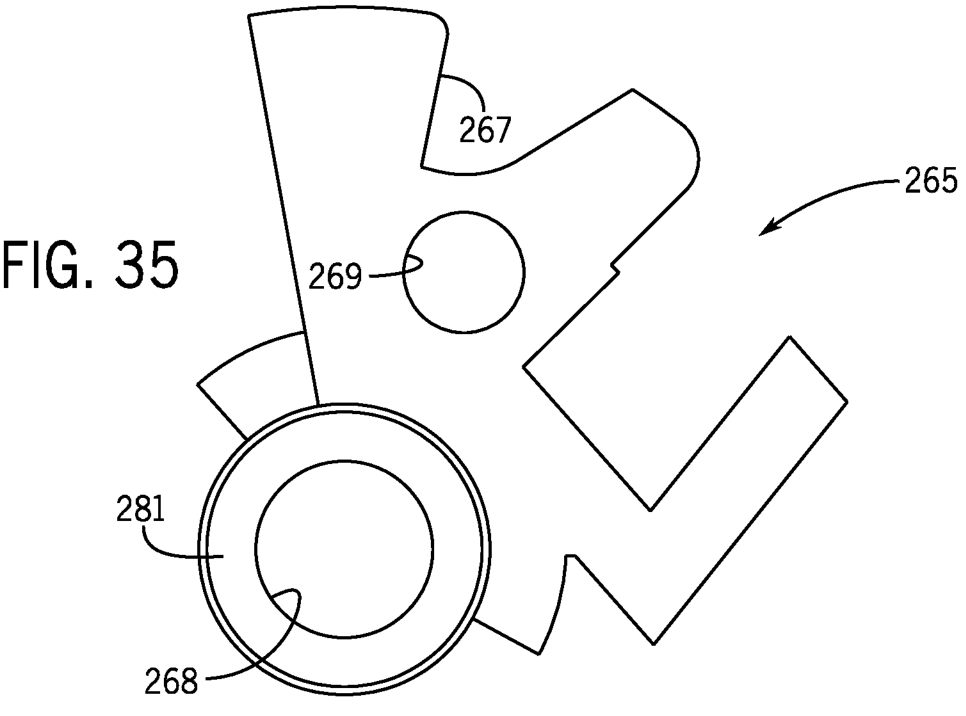
FIG. 35 is a right, side view of the gear of FIG. 33.
Figure 36:
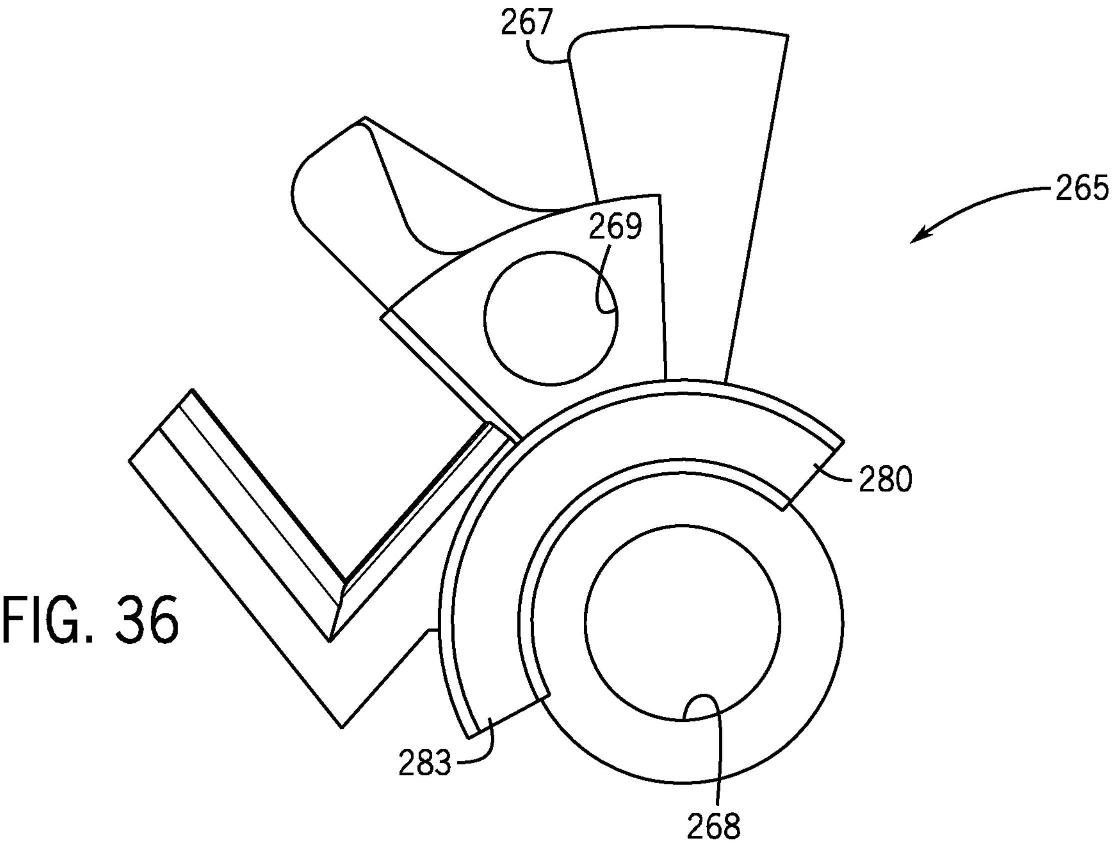
FIG. 36 is a left, side view of the gear of FIG. 33.
Figure 37:
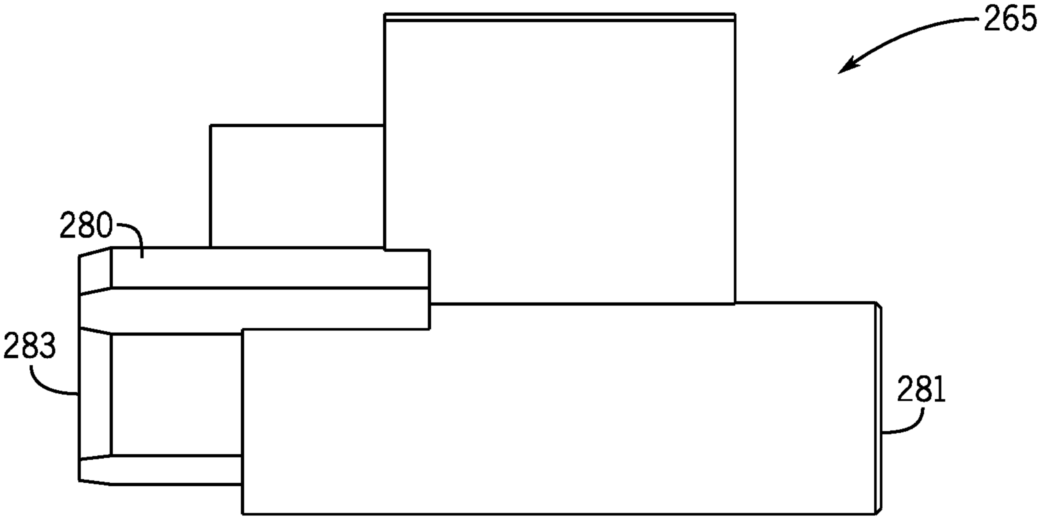
FIG. 37 is a front elevation view of the gear of FIG. 33.
Figure 41:
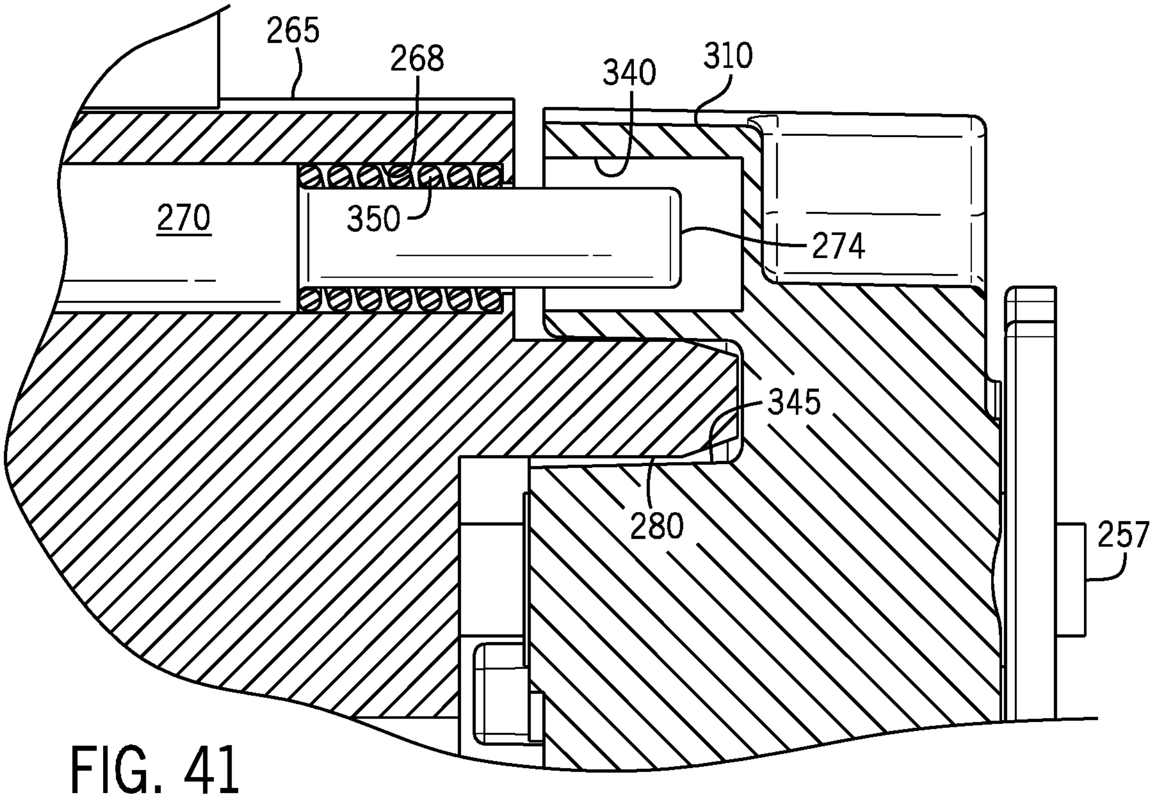
FIG. 41 is a partial sectional view of the circuit breaker of FIG. 28.

Turning next to FIG. 32, another embodiment of the transfer member 270 is illustrated. The transfer member 270 has a generally cylindrically configuration. The transfer member 270 extends between the first end 272 and the second end 274. A first portion 271 of the transfer member 270 has a first diameter, and a second portion 273 of the transfer member has a second diameter. The first diameter corresponds to a diameter of the elongated channel 269 in the gear 265 in which the transfer member 270 is mounted. The outer periphery of the first portion 271 of the transfer member 270 engages the inner periphery of the elongated channel 269 as the transfer member 270 slides within the elongated channel. The second diameter is less than the first diameter, such that a spring 350 (See FIG. 41) may be mounted around the second portion 273 of the transfer member 270 within the elongated channel 269 of the gear 265. A transition 276 between the first portion 271 and the second portion 273 provides a seat for a first end of the spring. A ring around the end of the elongated channel 269 proximate the second end 274 of the transfer member 270 provides a seat for a second end of the spring. When mounted within the elongated channel 269, the spring applies a biasing force on the transfer member 270 in a direction toward the first end 272 of the transfer member 270.

Turning next to FIGS. 33-37, one embodiment of the gear 265, which is configured to hold the transfer member 270 is illustrated. As previously discussed, the gear 265 includes an opening 268 through which a mounting pin 257 is inserted and about which the gear rotates. The gear 265 includes a gap 267 which acts as an engagement portion with the tooth 49 of the rotary actuator 40. The elongated channel 269 acts as a coupling portion to slidably receive the transfer member 270. According to the illustrated embodiment, the gear 265 extends between a first end 281 and a second end 283. The gear 265 further includes an arcuate boss 280 protruding from the second end 283.

Figure 31:
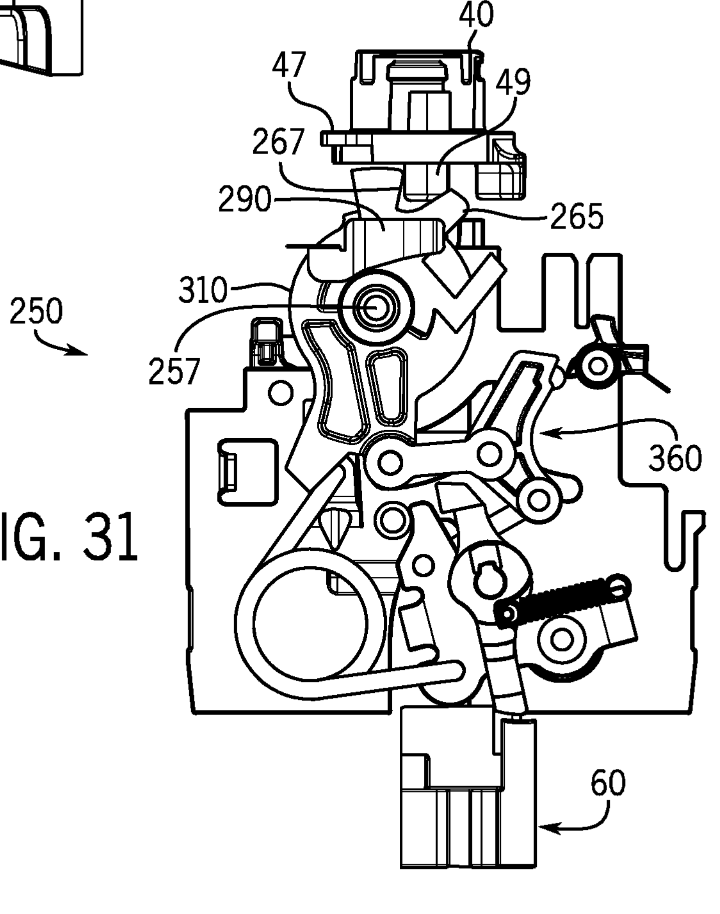
FIG. 31 is a side elevation view of the circuit breaker of FIG. 28.
Figure 38:
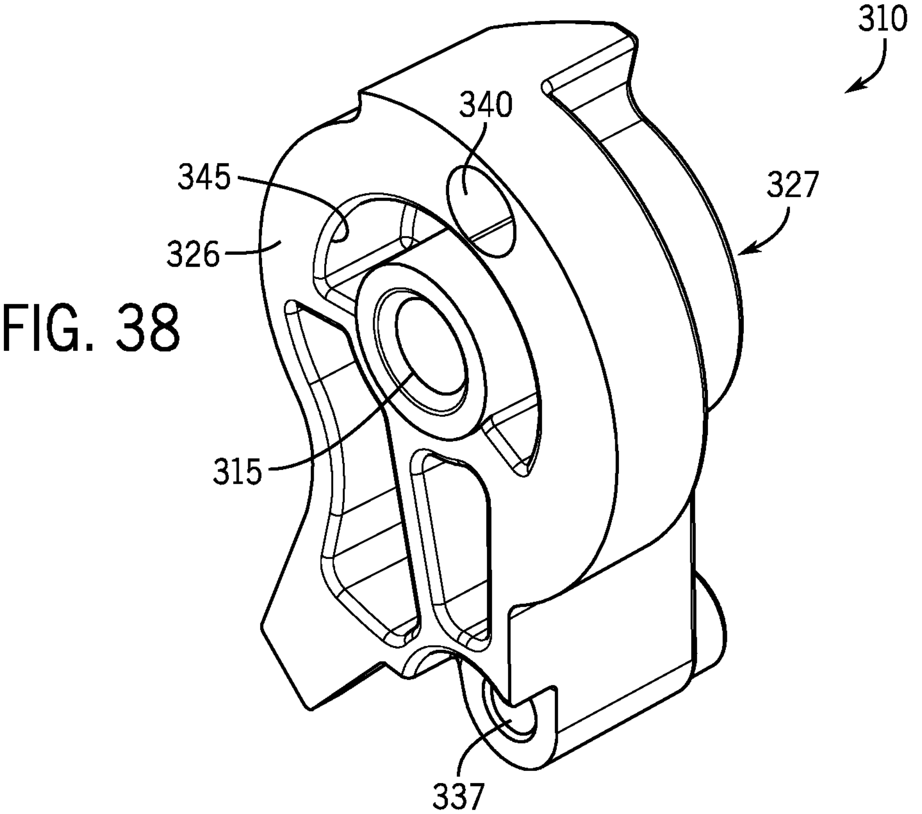
FIG. 38 is a perspective view of a rocker arm for the circuit breaker of FIG. 28.
Figure 39:
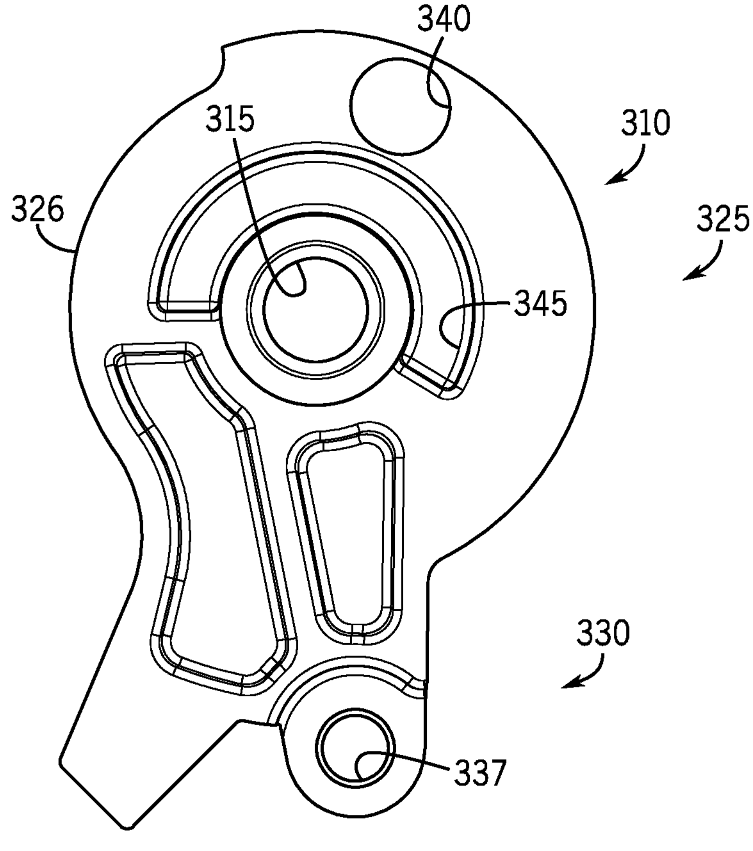
FIG. 39 is a side elevation view of the rocker arm of FIG. 38.
Figure 40:
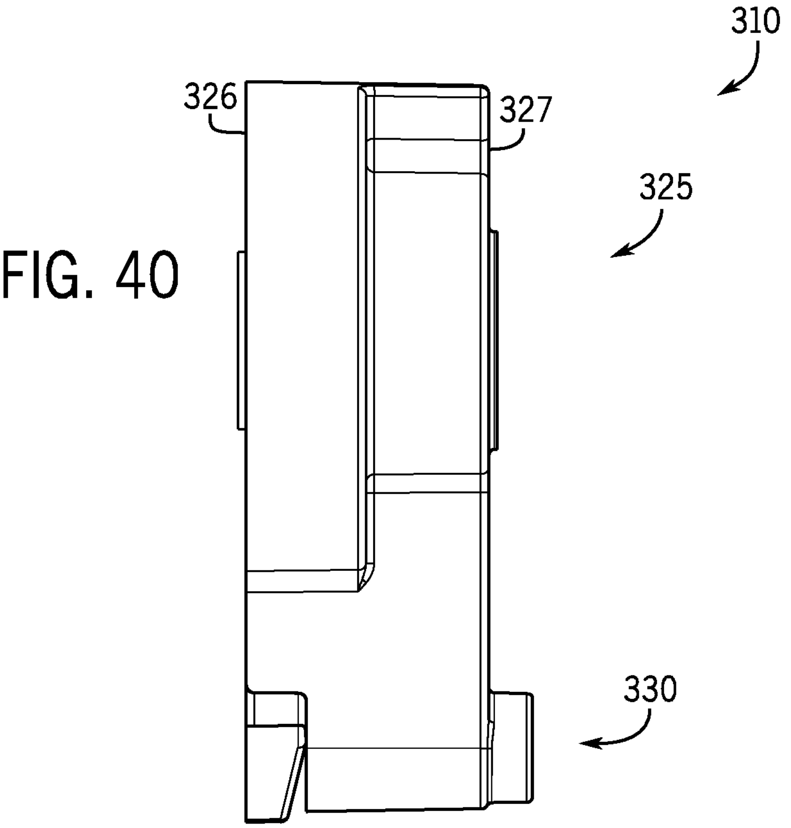
FIG. 40 is a front elevation view of the rocker arm of FIG. 38.

Turning next to FIGS. 38-40, another embodiment of the rocker arm 310 is illustrated. The rocker arm 310 includes an upper portion 325 and a lower portion 330. The rocker arm 310 also includes a first side 326 and a second side 327, where the second side is opposite the first side. The rocker arm 310 has an irregular geometric outer periphery extending between the respective first and second sides. As previously discussed, an opening 315 extends through the rocker arm 310 which is configured to receive the mounting pin 257 about which the rocker arm 310 rotates. The rocker arm 310 includes a second opening 337 extending therethrough near the lower portion of the rocker arm 310. The second opening 337 is configured to be coupled to a further mechanical linkage, as seen in FIG. 31. A recess 340 is located in the upper portion 325 of the rocker arm 310, and the recess 340 is configured to receive the second end 274 of the transfer member 270. An elongated slot 345 is also present in the upper portion 325 of the rocker arm 310. The elongated slot 345 is arcuate and curves around the opening 315 for the mounting pin 257. The elongated slot 345 is configured to receive the arcuate boss 280 from the gear 265.

Figure 8:
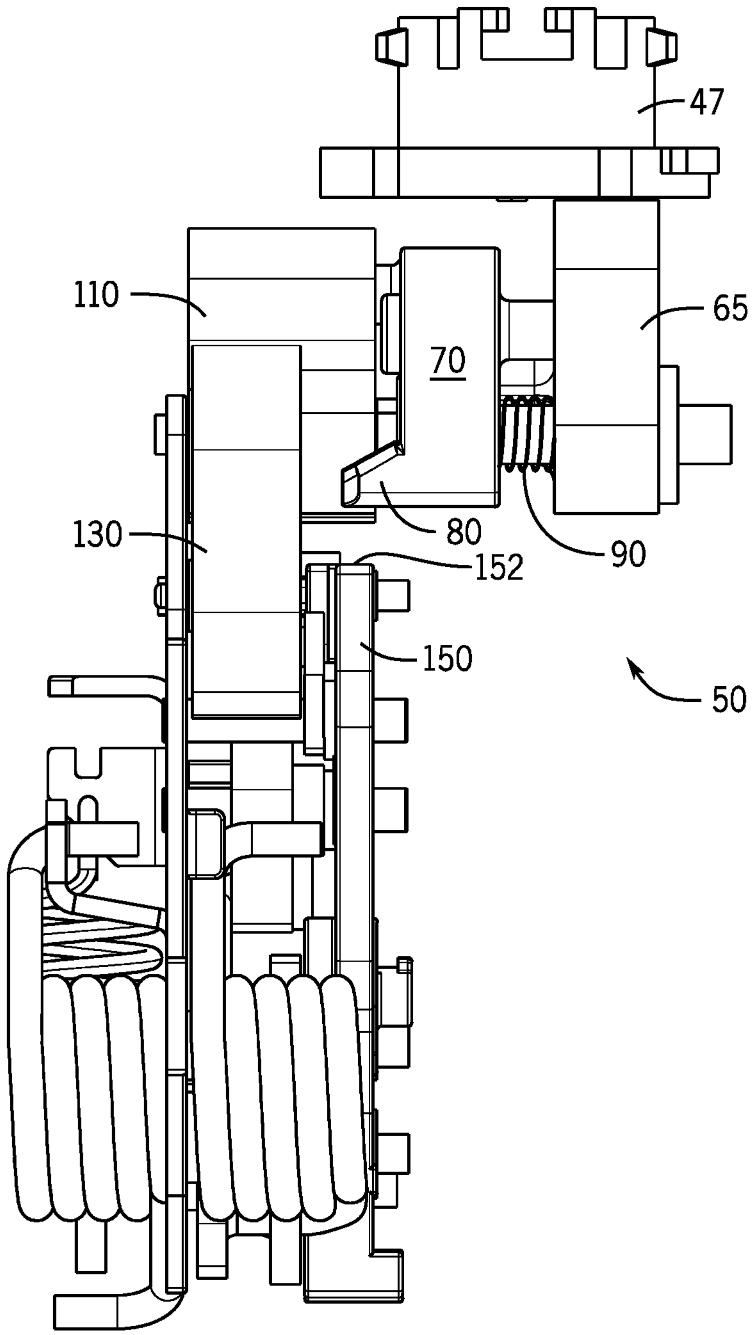
FIG. 8 is a bottom plan view of the switching mechanism of FIG. 6 in the Off position.
Figure 9:
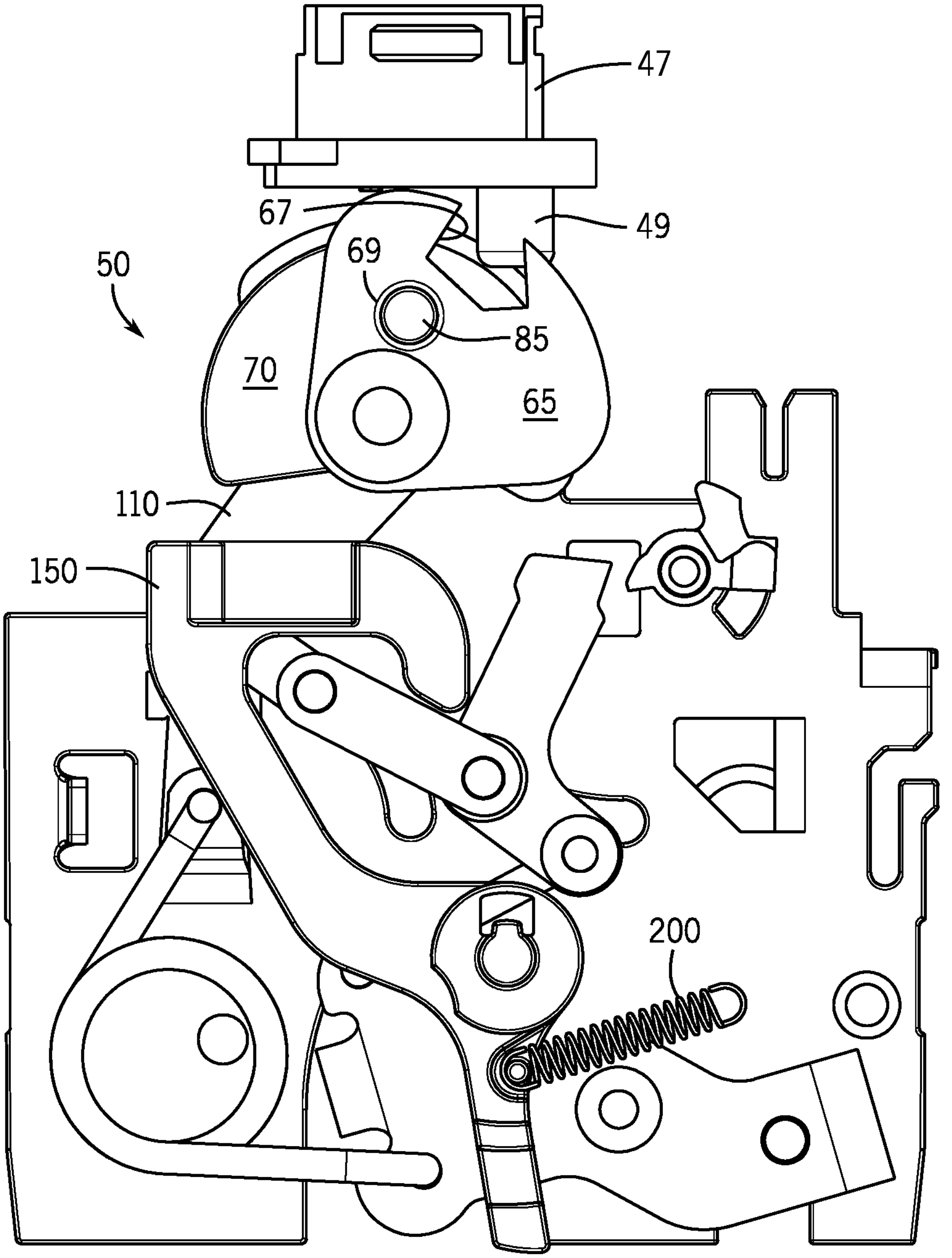
FIG. 9 is a side view of the switching mechanism of FIG. 6 in the Off position.
Figure 10:
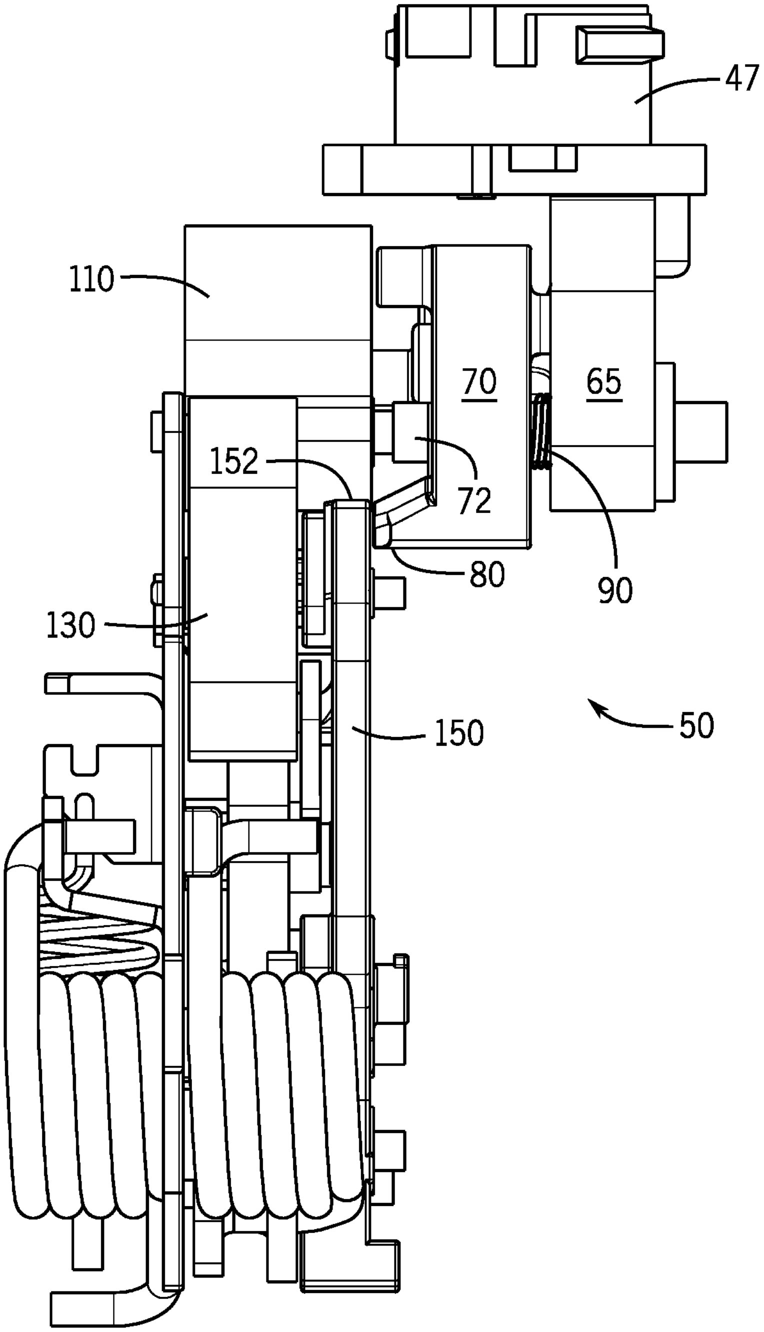
FIG. 10 is a bottom plan view of the switching mechanism of FIG. 6 transitioning between the Off position and the On position.
Figure 11:
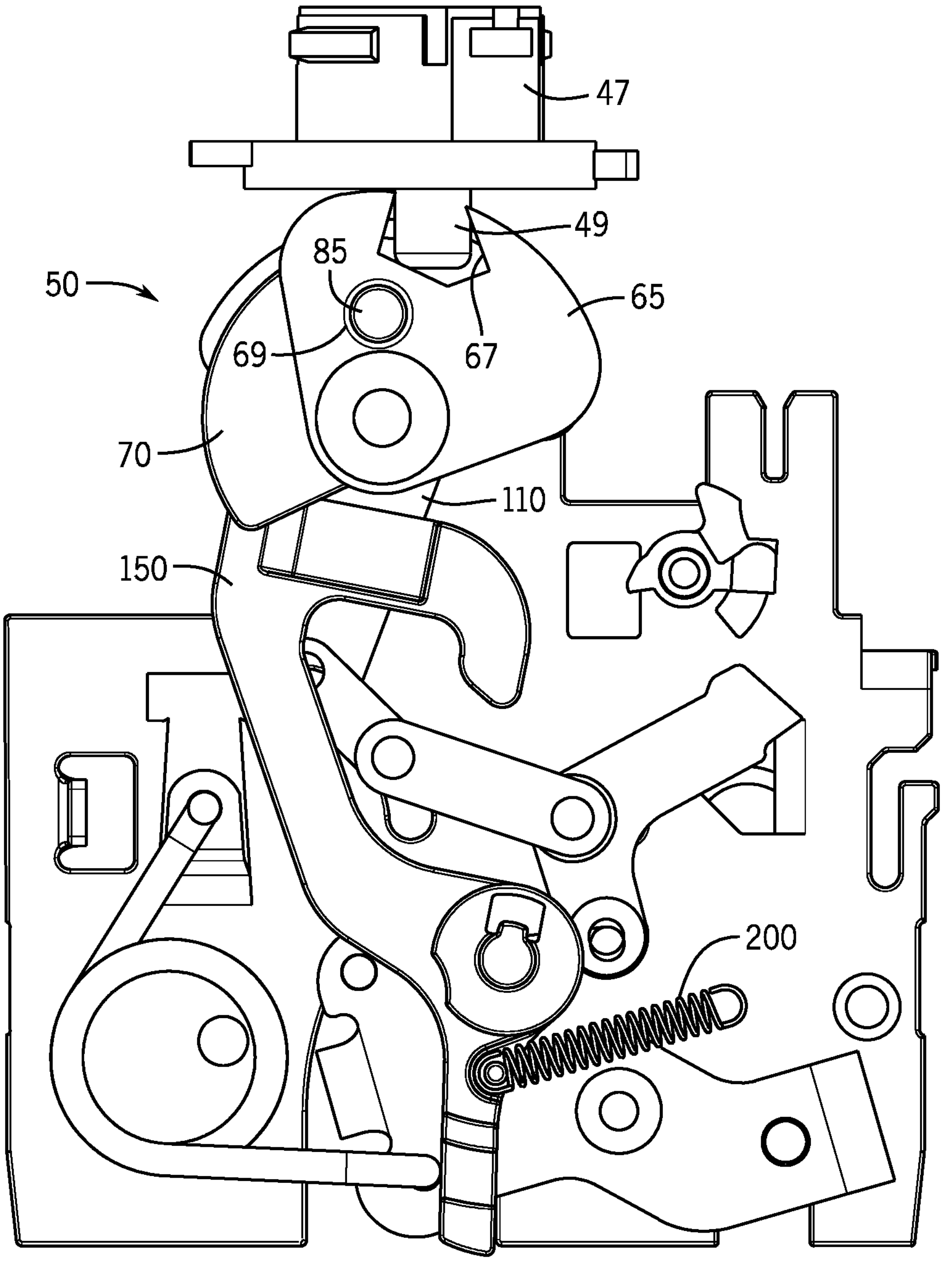
FIG. 11 is a side view of the switching mechanism of FIG. 6 transitioning between the Off position and the On position.
Figure 12:
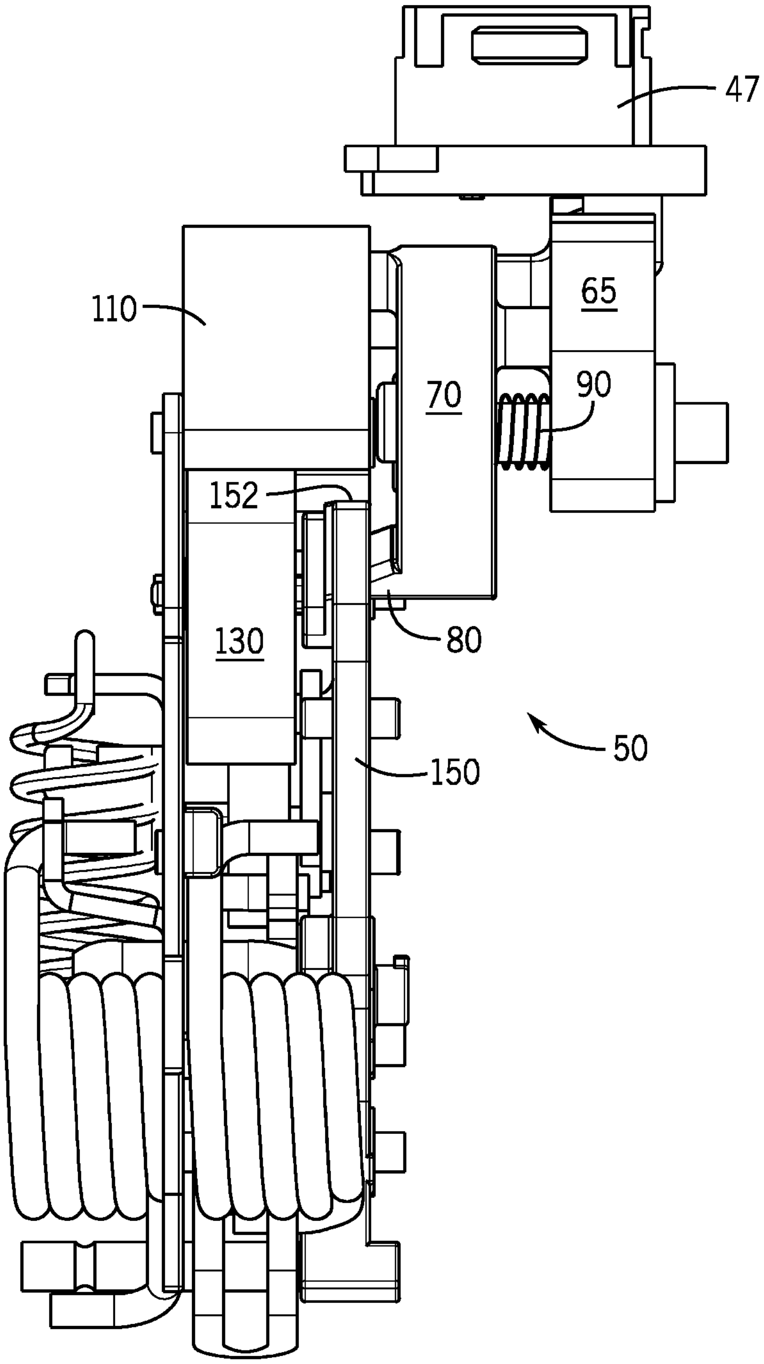
FIG. 12 is a bottom plan view of the switching mechanism of FIG. 6 in the On position.

In operation, the transfer member 70 and rocker arm 110 work together to provide a switch 10 that provides for smoother operation over an extended range of motion of the rotary actuator 40. Turning next to FIGS. 8-13 one embodiment of the mechanical linkage 50 within the switch 10 is illustrated in stages transitioning from an Off state to an On state. To start, the switch 10 is shown in an Off state (FIGS. 8-9). The inner rotational member 47 of the rotary actuator 40 is in a first position, or the Off state. The tooth 49 extending downward is either not engaging the gap 67 of the gear 65 or may be positioned within the gap in the Off state. As the rotary actuator 40 begins turning, the tooth 49 engages the side wall of the gap 67 and begins to cause rotation of the gear 65. The engagement of the tooth 49 from the rotary actuator 40 with the gear 65 is felt by the operator and begins transferring a first force applied to the rotary actuator to the mechanical linkage 50. The transference of the first force between the rotary actuator and the mechanical linkage 50 begins at about twenty to thirty degrees of rotation, where ninety degrees of rotation completes the transition between states.

The gear 65 is initially coupled to the transfer member 70 and to the rocker arm 110 while in the Off state, such that rotation of the gear 65 from the Off state to the On state causes rotation of the transfer member 70 and the rocker arm 110. The boss 85, protruding from the second side 73 of the transfer member 70, is inserted in the opening 69 of the gear 65, creating a coupling between the transfer member 70 and the gear 65. Rotation of the gear 65 causes rotation of the transfer member 70. The first boss 72 and the second boss 76, protruding from the first side 71 of the transfer member 70, are each positioned within the slot 120 of the rocker arm 110. As the transfer member 70 begins rotating in response to the rotation of the gear 65, the first boss 72 engages a side of the slot 120, causing rotation of the rocker arm 110.

The transfer member 70 is slidably mounted within the switch 10 such that it may move axially back and forth between the gear 65 and the rocker arm 110. As previously discussed, a mounting pin 57 extends through the gear 65, transfer member 70, and rocker arm 110, providing a common axis of rotation 75 about which each of the three members rotates within the switch. According to the illustrated embodiment, a spring 90 is mounted around the mounting pin 57 and between the gear 65 and the transfer member 70. The spring 90 applies a biasing force on the transfer member 70, axially positioning the transfer member 70 towards the rocker arm 110. It is contemplated that the spring 90 may be mounted, for example, on the boss 85 and between the transfer member 70 and gear 65. Optionally, other types of springs, rather than the illustrated coil spring 90, may be utilized to apply the biasing force on the transfer member 70 without deviating from the scope of the invention. The spring 90 applies a biasing force such that the first boss 72 of the transfer member 70 is initially located within the slot 120 of the rocker arm 110.

As the transfer member 70 rotates, the engagement member 80 of the transfer member 70 contacts a complementary engagement portion of the lever arm 150. More specifically, a tapered engagement surface 81 of the engagement member 80 contacts the first end 152 of the lever arm 150. Continued rotation of the transfer member 70 causes the engagement surface 81 to slide down from the first end 152 and adjacent to the second side 162 of the lever arm 150. The tapered engagement surface 81 allows for some variation in alignment of the transfer member 70 with the first end 152 of the lever arm 150 while still achieving successful engagement between surfaces. The tapered engagement surface 81 also causes the transfer member to compress the spring 90 and slide away from the rocker arm 110 along the axis of rotation 75 as the engagement member 80 rotates down to the second send 162 of the lever arm 150. The transfer member 70 is slidably mounted on the mounting pin 57 and the boss 85 mounted on the second side 73 of the transfer member is slidably mounted within the opening 69 in the gear 65. As the transfer member 70 slides away from the rocker arm 110, the first boss 72 on the first side 71 of the transfer member exits the slot 120 and stops causing further rotation of the rocker arm 110.

During rotation, the rocker arm 110 engages the lever arm 150 which, in turn, allows the contacts 55 on the switch 10 to close. As discussed above, rotation of the transfer member 70 will initially cause rotation of the rocker arm 110 due to the first boss 72 of the transfer member 70 engaging the slot 120 of the rocker arm. As the rocker arm 110 rotates about the axis of rotation 75, the elongated member 130 engages the engagement member 165 of the lever arm 150. The lever arm 150 pivots around the pivotal mount 157. As the second end 154 of the lever arm 150 moves from the Off position to the On position, the plunger 60 is released and the contacts 55 close. The contacts close when the rotary actuator 40 has completed greater than eighty degrees of rotation. Thus, rotation of the rotary actuator 40 in a first direction spreads out actuation of the switch from about twenty to thirty degrees of rotation to over eighty degrees of rotation, while still providing for a quick closure of the contacts 55 due to the spring force applied against the plunger 60. The primary force required by the switch 10 to transition from the Off state to the On state occurs, therefore, over a range of fifty to sixty degrees of rotation in the first direction. In the ON state, the mechanical linkage 50 is in a stable position, allowing the mechanical linkage 50 to remain in the ON state until a second force is applied in the opposite direction.

Figure 7:
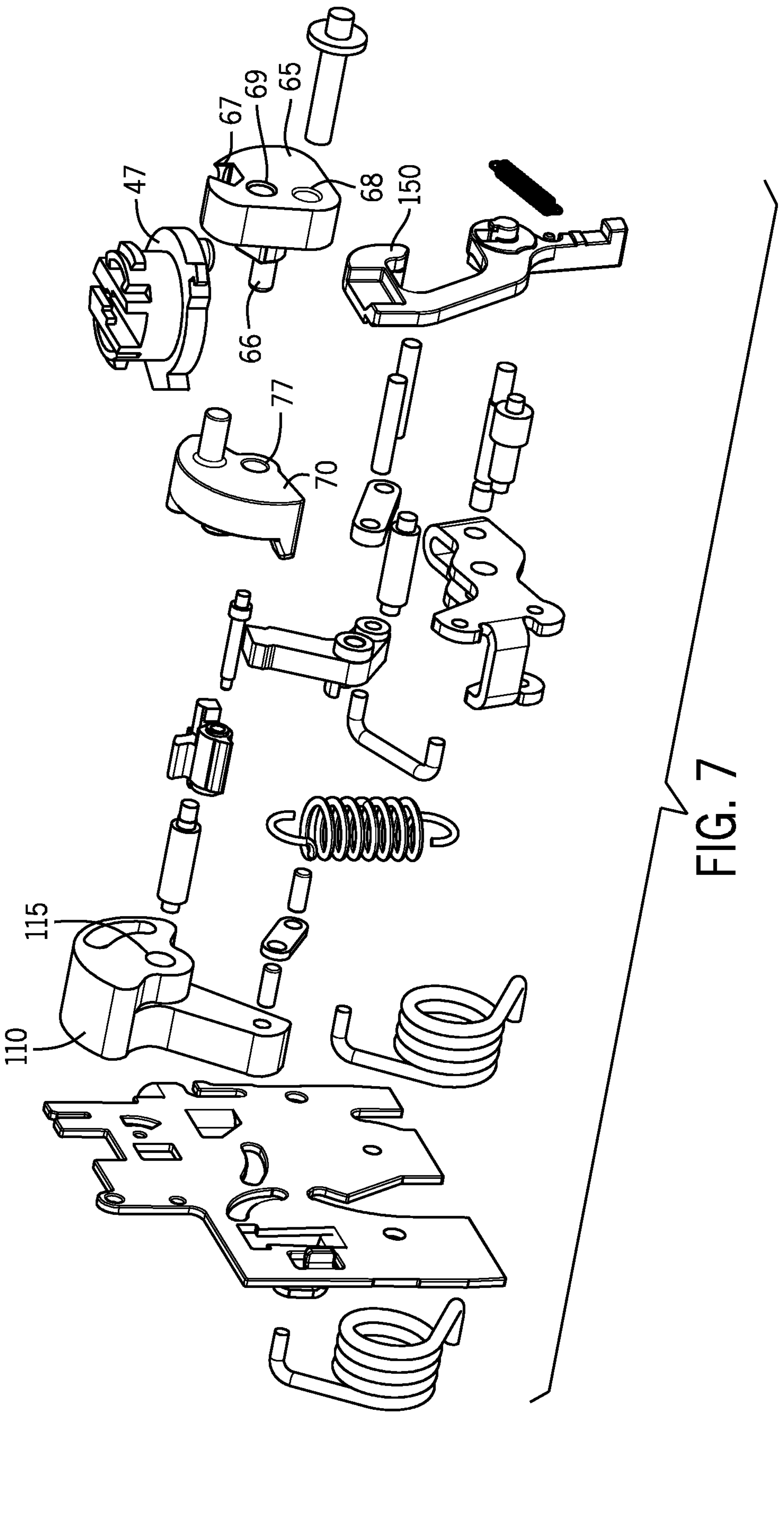
FIG. 7 is a partial exploded view of the switching mechanism of FIG. 6.

To turn the switch Off, the second force is applied to the rotary actuator 40 in the opposite direction. As the rotary actuator 40 begins rotating in the opposite direction, the tooth 49 again engages the gap 67 of the gear 65. As illustrated in FIG. 7, the gear 65 includes a boss 66 protruding toward the rocker arm 110 as well. This boss 66 extends past the transfer member 70 and is configured to slide within the elongated slot 120 of the rocker arm 110. The gear 65 and the transfer member 70 are configured to rotate in tandem as a result of the boss 85 on the transfer member slidably engaging the opening 69 in the gear 65. It is contemplated, therefore, that the transfer member 70 may be configured to extend further in the direction of the boss 66 from the gear 65 and include an additional boss to replace the boss 66 from the gear 65. In either embodiment, the boss 66 (as illustrated) or an additional boss from the transfer member is configured to engage the opposite end of the slot 120 used to turn the switch On. The boss 66 transfers the second force from the gear 65 to the rocker arm 110 to begin rotation of the rocker arm 110 from the On position to the Off position.

As the rocker arm 110 begins rotating from the On position to the Off position, the elongated member 130 of the rocker arm 110 no longer applies a force against the engagement member 165 of the lever arm 150. A spring 200 is mounted to the lower portion 153 of the rocker arm 150 applying a biasing force to the rocker arm 110 toward the Off position. The spring 200 causes the engagement member 165 of the rocker arm 110 to follow the elongated member 130 as the elongated member is rotated away from the rocker arm 110. After the rocker arm 110 and lever arm 150 rotate a short distance, the mechanical linkage 50 passes a stable position, such that additional springs and the corresponding spring forces within the switch 10 cause the lever arm 150 and rocker arm 110 to jump back to the Off state. The jump also causes the lever arm 150 to force the plunger 60 downward, separating the contacts 55 in the switch 10 and putting the switch back in the Off state. This jump occurs when the rotary actuator 40 has reached about the same position at which the contacts 55 close or slightly before the rotary actuator has returned to the eighty degree position. The primary force required by the switch 10 to transition from the On state to the Off state occurs, therefore, over about ten degrees of rotation in the second direction.

As the rotary actuator 40 continues turning back to the full Off position, the gear 65 continues turning the transfer member 70 back to the off position. The first boss 72 of the transfer member 70 is biased against the second side 127 of the body portion 125 of the rocker arm 110 by the spring 90. The first boss 72 slides along the second side 127 until it again reaches the slot 120. The spring 90 forces the transfer member 70 away from the gear 65 and toward the rocker arm 110 causing the first boss 72 to again engage the slot 120 on the rocker arm.

Turning next to FIGS. 28-31 another embodiment of the mechanical linkage 250 within the switch 10 is illustrated in the Off state. The inner rotational member 47 of the rotary actuator 40 is in a first position, or the Off state. The tooth 49 extending downward is either not engaging the gap 267 of the gear 265 or may be positioned within the gap in the Off state. As the rotary actuator 40 begins turning, the tooth 49 engages the side wall of the gap 267 and begins to cause rotation of the gear 265. The engagement of the tooth 49 from the rotary actuator 40 with the gear 265 is felt by the operator and begins transferring a first force applied to the rotary actuator to the mechanical linkage 250. The transference of the first force between the rotary actuator and the mechanical linkage 250 begins at about twenty to thirty degrees of rotation, where ninety degrees of rotation completes the transition between states.

The transfer member 270 is slidably mounted within the gear 265. In the Off state, the first end 272 of the transfer member 270 engages an interference member 290. The interference member 290 applies a force to the first end 272 of the transfer member 270 that is sufficient to overcome the biasing force from the spring 350 mounted within the elongated channel 269 of the gear 265. The interference member 290 causes the transfer member 270 to slide toward the rocker arm 310, inserting the second end 274 of the transfer member 270 into the recess 340 on the rocker arm. According to the illustrated embodiment, the interference member 290 is a flat spring. The force applied by the flat spring exceeds the force applied by the coil spring 350, causing the transfer member 270 to slide toward the rocker arm 310 and compressing the coil spring 350. Optionally, a rigid member may be utilized for the interference member 290, where the rigid member has an angled form similar to that seen in the top view of FIG. 29. The transfer member 270 couples the gear 265 to the rocker arm 310 in the OFF state. Consequently, as the gear 265 begins rotation from the OFF state to the ON state, the rocker arm 310 similarly begins rotation between the OFF state and the ON state.

Figure 29:
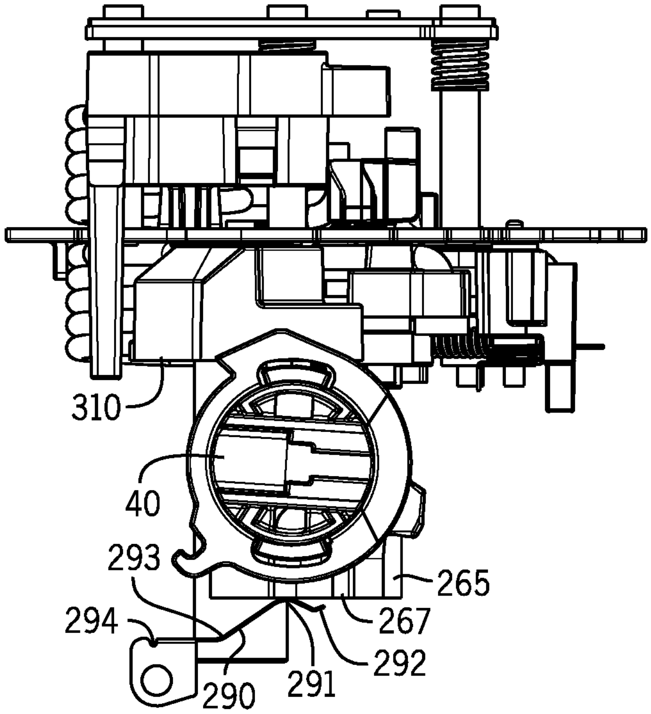
FIG. 29 is a top plan view of the circuit breaker of FIG. 28.
Figure 30:
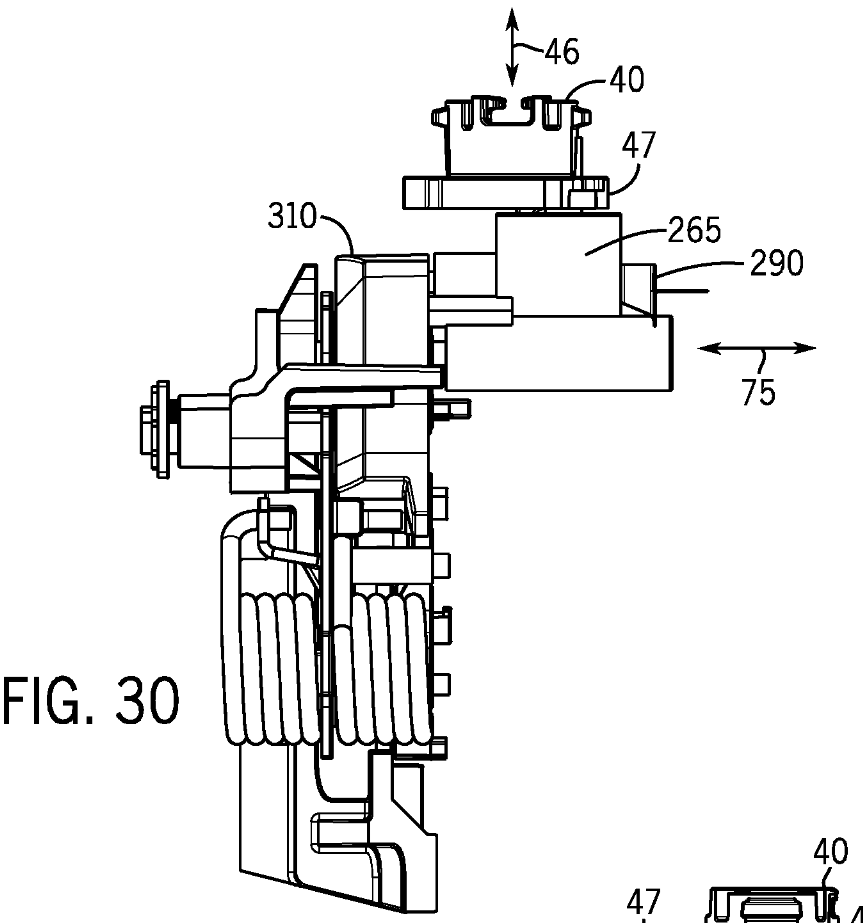
FIG. 30 is a front elevation view of the circuit breaker of FIG. 28.

As the gear 265 rotates, the first end 272 of the transfer member 270 rotates along the interference member 290. As seen in FIG. 29, the interference member 290 has a first end 292 and a second end 294. The first end 292 of the interference member is located proximate the first end 272 of the transfer member in the OFF state. As the gear 265 rotates, the transfer member 270 travels along the interference member 290 from the first end 292 toward the second end 294. The interference member 290 has a first bend 291 proximate the first end 292 and a second bend 293 proximate the second end 294. The interference member 290 is shaped such that the surface of the interference member 290 is angled away from the gear 265 between the first bend 291 and the second bend 293. As a result, the interference member 290 allows the spring 350 within the elongated channel 269 to slide the transfer member 270 away from the rocker arm 310 during rotation of the gear 265 and rocker arm 310. After the gear 265 and rocker arm 310 have reached the ON state, the first end 272 of the transfer member 270 either no longer engages the interference member 290 or the displacement of the second end 294 of the interference member from the rocker arm 310 is sufficient to allow the second end 274 of the transfer member 270 to be completely removed from the recess 340 in the rocker arm 310, and the transfer member 270 no longer transfers force from the gear 265 to the rocker arm 310.

During rotation, the rocker arm 310 engages a further mechanical linkage 360 which, in turn, allows the contacts 55 on the switch 10 to close. As discussed above, rotation of the transfer member 270 will initially cause rotation of the rocker arm 310 due to the transfer member 270 engaging the recess 340 of the rocker arm. As the rocker arm 310 rotates about the axis of rotation 75, the lower portion 330 of the rocker arm 310 pivots around the mounting opening 315. The second opening 337 proximate the lower end of the rocker arm 310 serves as an engagement portion of the rocker arm 310 and is coupled to the additional mechanical linkage 360. Rather than a single lever arm 150, as discussed above with respect to one embodiment of the invention, multiple linkages are pivotally or slidably connected to transfer the force from the rocker arm 310 to the plunger 60. A linking member of the additional mechanical linkage 360 is fixedly, and pivotally mounted within the second opening 337 to serve as an engagement portion of the additional mechanical linkage 360. Rotation of the lower portion 330 of the rocker arm 310 causes one end of the linking member to move right and the other end of the linking member to rotate downward to engage a lever arm, which, in turn, engages the plunger 60. When the rocker arm 310 reaches the On state, the additional mechanical linkage 360 has allowed the plunger 60 to release and the contacts 55 within the switch 10 to close. The contacts close when the rotary actuator 40 has completed greater than eighty degrees of rotation. Thus, rotation of the rotary actuator 40 in a first direction spreads out actuation of the switch from about twenty to thirty degrees of rotation to over eighty degrees of rotation, while still providing for a quick closure of the contacts 55 due to the spring force applied against the plunger 60. The primary force required by the switch 10 to transition from the Off state to the On state occurs, therefore, over a range of fifty to sixty degrees of rotation in the first direction. In the ON state, the mechanical linkage 250 is in a stable position, allowing the mechanical linkage 250 to remain in the ON state until a second force is applied in the opposite direction.

To turn the switch Off, the second force is applied to the rotary actuator 40 in the opposite direction. As the rotary actuator 40 begins rotating in the opposite direction, the tooth 49 again engages the gap 267 of the gear 265. The arcuate boss 280 of the gear 265 is positioned within the arcuate slot 345 of the rocker arm 310. One end of the arcuate boss 280 engages a side wall of the arcuate slot 345, transferring the second force from the gear 265 to the rocker arm 310 to begin rotation of the rocker arm 310 from the On position to the Off position. As the rocker arm 310 begins rotating from the On position to the Off position, the lower portion 330 of the rocker arm 310 pivots away from the additional mechanical linkage 360. Further, because the second opening 337 is coupled to the additional mechanical linkage 360, the rocker arm 310 causes the additional mechanical linkage to begin returning to the Off position. One or more springs connected to the additional mechanical linkage 360 apply a biasing force on the mechanical linkage 360 to return to the Off position. After the gear 367 and rocker arm 310 rotate a short distance, the rocker arm 310 draws the additional mechanical linkage 360 past a stable position, such that the additional springs and the corresponding spring forces within the switch 10 cause the additional mechanical linkage 360 and the rocker arm 310, connected to the additional mechanical linkage, to jump back to the Off state. The jump also forces the plunger 60 downward, separating the contacts 55 in the switch 10 and putting the switch back in the Off state. This jump occurs when the rotary actuator 40 has reached about the same position at which the contacts 55 close or slightly before the rotary actuator has returned to the eighty degree position. The primary force required by the switch 10 to transition from the On state to the Off state occurs, therefore, over about ten degrees of rotation in the second direction.

As the rotary actuator 40 continues turning back to the full Off position, the gear 265 continues turning toward the Off position. The second end 274 of the transfer member 270 slides along the first side 326 of the rocker arm 310. The first end 272 of the transfer member 270 engages the interference member 290 causing compression of the spring 350 in the elongated channel 269. The second end 274 of the transfer member 270 continues to slide along the first side 326 of the rocker arm 310 until the transfer member 270 is again positioned in front of the recess 340 in the rocker arm 310. The second end 374 of the transfer member 270 then slides into the recess 340 on the rocker arm 310 returning the switch to the Off position.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus for a switch, comprising:
- a first rotational member, including:
  - a first engagement portion, and
  - a first coupling portion, wherein:
    - the first engagement portion is configured to receive a force applied to the switch, and
    - the first rotational member moves between a first position and a second position responsive to receiving the force applied to the switch;
- a second rotational member, including:
  - a second coupling portion, and
  - a second engagement portion, wherein the second rotational member moves between a third position and a fourth position responsive to receiving the force applied to the switch; and
- a transfer member, including:
  - a third coupling portion configured to engage the first coupling portion of the first rotational member, and
  - a fourth coupling portion configured to selectively engage the second coupling portion of the second rotational member, wherein the transfer member receives the force applied to the switch from the first rotational member via the third coupling portion and transfers the force applied to the switch to the second rotational member via the fourth coupling portion, and wherein the transfer member is configured to move between a fifth position and a sixth position responsive to the first rotational member moving between the first position and the second position.

2. The apparatus of claim 1 wherein:
- the fourth coupling portion engages the second coupling portion to transfer the force applied to the switch from the first rotational member to the second rotational member in a first direction, and
- the fourth coupling portion is disengaged from the second coupling portion during rotation in a second direction, the second direction opposite the first direction.

3. The apparatus of claim 2, wherein:
- the transfer member has a first end and a second end;
- the third coupling portion is an outer periphery of the transfer member;
- the first coupling portion is an elongated channel in which the transfer member is slidably mounted within the first rotational member;
- the fourth coupling portion is the second end of the transfer member;
- the second coupling portion is a recess in the second rotational member; and
- the apparatus further comprises:
- a spring configured to apply a biasing force to the transfer member; and
- an interference member mounted in the switch to selectively engage the first end of the transfer member.

4. The apparatus of claim 3, wherein:
- the interference member is a second spring configured to apply a second biasing force to the transfer member;
- the second biasing force is greater than the biasing force;
- when the switch is rotated in the first direction:
  - the interference member initially applies the second biasing force to the first end of the transfer member causing the second end of the transfer member to be inserted within the recess in the second rotational member, and
  - the interference member disengages the transfer member during rotation and the biasing force moves the transfer member to the sixth position causing the second end of the transfer member to disengage from the recess in the second rotational member; and
- when the switch is rotated in the second direction:
  - the second end of the transfer member is initially disengaged from the recess in the second rotational member, and
  - the interference member engages the transfer member during rotation and the second biasing force moves the transfer member to the fifth position causing the second end of the transfer member to engage the recess in the second rotational member.

5. The apparatus of claim 2, wherein:
- the transfer member is a third rotational member mounted on a pin with the first rotational member such that the first and third rotational members have a common axis of rotation;
- the third coupling portion is a first boss protruding from the transfer member toward the first rotational member;
- the first coupling portion is an opening in the first rotational member configured to receive the first boss;
- the fourth coupling portion is a second boss protruding from the transfer member toward the second rotational member;
- the second coupling portion is an elongated slot configured to receive the second boss;
- the transfer member further includes a third engagement portion; and
- the apparatus further comprises:
- a spring configured to apply a biasing force to the transfer member; and
- a lever arm having a fourth engagement portion.

6. The apparatus of claim 5, wherein:
the spring applies the biasing force on the transfer member toward the second rotational member;
when the switch is rotated in the first direction:
the fourth coupling portion is initially inserted in the second coupling portion causing rotation of the second rotational member, and
the third engagement portion engages the fourth engagement portion, sliding the transfer member toward the first rotational member, causing the spring to compress, and disengaging the fourth coupling portion from the second coupling portion; and
when the switch is rotated in the second direction:
the second rotational member jumps back to the third position,
the third engagement portion disengages the fourth engagement portion, and
the biasing force causes the fourth coupling portion to reinsert into the second coupling portion.

7. The apparatus of claim 1 further comprising a rotary actuator configured to receive the force applied to the switch to move between an Off position and an On position, wherein the rotary actuator includes:
a first portion extending beyond a housing for the switch,
a second portion within the housing for the switch, and
a third rotational member having a third engagement portion, wherein the third engagement portion transfers the force applied to the switch to the first engagement portion.

8. The apparatus of claim 7 wherein:
the first engagement portion is either a gap or a tooth;
the third engagement portion is either a gap or a tooth; and
the combination of the first and third engagement portions include both the gap and the tooth.

9. The apparatus of claim 1 further comprising:
a plunger selectively positioned in a seventh position and an eighth position, wherein:
when the plunger is in the seventh position, the plunger allows at least one set of contacts in the switch to open, and
when the plunger is in the eighth position, the plunger causes the at least one set of contacts to close; and
a mechanical linkage, including:
a third engagement portion configured to receive the force applied to the switch via the second engagement portion, and
a fourth engagement portion configured to selectively move the plunger between the seventh and the eight positions.

10. The apparatus of claim 9, wherein the second engagement portion of the second rotational member is pivotally coupled to the third engagement portion of the mechanical linkage.

11. The apparatus of claim 9, wherein the mechanical linkage is a lever arm.

12. A method for reducing a force applied to a switch, the method comprising the steps of:
applying a first force to a rotary actuator of a switch in a first direction, and
applying a second force to the rotary actuator of the switch in a second direction, wherein:
the first force causes the switch to transition between an Off position and an On position,
the second force causes the switch to transition between the On position and the Off position,
the first force is applied over a first range of motion of the rotary actuator,
the second force is applied over a second range of motion of the rotary actuator, and
the first range of motion is greater than the second range of motion.

13. The method of claim 12, further comprising the steps of:
transferring the first force and the second force from the rotary actuator to a transfer member via a gear located within the switch;
moving the transfer member between the Off position and the On position when the first force is received at the transfer member; and
moving the transfer member between the On position and the Off position when the second force is received at the transfer member.

14. The method of claim 13, further comprising the steps of:
engaging a first end of a slot in a rocker arm with the transfer member when moving the transfer member between the Off position and the On position to move the rocker arm between the Off position and the On position; and
engaging a second end of the slot in the rocker arm with a boss extending from either the transfer member or the gear to begin moving the rocker arm between the On position and the Off position.

15. The method of claim 14, wherein moving the rocker arm between the On position and the Off position further comprises the steps of:
beginning motion of the rocker arm between the On position and the Off position by engaging the second end of the slot with the boss; and
receiving a biasing force on the rocker arm from a spring, wherein the biasing force is applied in a direction to move the rocker arm from the On position and the Off position, wherein when the motion of the rocker arm begins between the On position and the Off position, the biasing force causes the rocker arm to jump from the On position to the Off position before the transfer member completes moving from the On position to the Off position.

16. A switching device for industrial equipment having at least one pair of contacts, the switching device comprising:
a transfer member mounted in the switching device, wherein the transfer member is configured to receive a first force applied to the switching device in a first direction and to receive a second force applied to the switching device in a second direction;
a rocker arm rotatably mounted in the switching device, wherein:
the rocker arm engages the transfer member to receive the first force over a first angle of rotation,
the rocker arm receives the second force over a second angle of rotation, and
the second angle of rotation is less than the first angle of rotation;
a plunger actuated to selectively open and close at least one pair of contacts in the switching device when the switching device is moved between the Off position and the On position; and
a mechanical linkage operatively connected between the rocker arm and the plunger, wherein the mechanical linkage engages the plunger to selectively close the at least one pair of contacts as the rocker arm moves over the first angle of rotation and the mechanical linkage engages the plunger to selectively open the at least one pair of contacts as the rocker arm moves over the second angle of rotation.

17. The switching device of claim 16, further comprising:

a rotary actuator, including:

a first portion extending beyond a housing for the switching device and configured to receive the first force and the second force applied to the switching device, a rotational member within the housing for the switch; and a gear mounted within the housing and configured to engage the rotational member of the rotary actuator.

18. The switching device of claim 17, wherein the transfer member slidably mounts within an elongated channel of the gear to selectively engage the rocker arm.

19. The switching device of claim 17, wherein:

the transfer member rotatably mounts between the gear and the rocker arm, each of the gear, the transfer member, and the rocker arm rotate about a common axis of rotation, and the transfer member is slidable mounted on the axis of rotation to selectively move between the gear and the rocker arm.

20. The switching device of claim 16, wherein the rocker arm further comprises:

a body portion, including:

a first side, a second side, opposite the first side, and an elongated slot extending along the second side of the body portion, wherein:

the second side is oriented toward the transfer member when the body portion is mounted in the switching device, and the elongated slot selectively engages the transfer member; and an elongated member, including:

a first side, and a second side, opposite the first side, wherein:

the first side and the second side of the elongated member are generally parallel to the first side and the second side of the body portion, and the elongated member extends away from the body portion.

* * * * *